(12) United States Patent
Monk et al.

(10) Patent No.: US 8,085,802 B1
(45) Date of Patent: Dec. 27, 2011

(54) MULTIMEDIA OVER COAXIAL CABLE ACCESS PROTOCOL

(75) Inventors: Anton Monk, San Diego, CA (US); Brett Bernath, San Diego, CA (US); Itzhak Gurantz, San Diego, CA (US); Ladd El Wardanj, La Jolla, CA (US); Ron Porat, San Diego, CA (US); Yusuf Ozturk, San Diego, CA (US); Ron Lee, San Diego, CA (US); Wee-Peng Goh, Murrieta, CA (US); Magnus Berggren, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 775 days.

(21) Appl. No.: 11/292,939

(22) Filed: Dec. 2, 2005
(Under 37 CFR 1.47)

Related U.S. Application Data

(60) Provisional application No. 60/632,856, filed on Dec. 2, 2004.

(51) Int. Cl.
*H04L 12/28* (2006.01)
(52) U.S. Cl. ........................................ 370/419; 709/203
(58) Field of Classification Search .................. 370/465, 370/400, 338, 392, 419; 709/203, 208
See application file for complete search history.

(56) References Cited

U.S. PATENT DOCUMENTS

| | | | | |
|---|---|---|---|---|
| 4,761,796 A | * | 8/1988 | Dunn et al. | 375/133 |
| 6,826,195 B1 | * | 11/2004 | Nikolich et al. | 370/465 |
| 7,184,777 B2 | * | 2/2007 | Diener et al. | 455/456.1 |
| 2002/0080790 A1 | * | 6/2002 | Beshai | 370/392 |
| 2003/0012163 A1 | * | 1/2003 | Cafarelli et al. | 370/338 |

* cited by examiner

*Primary Examiner* — Dang Ton
*Assistant Examiner* — Wei Zhao
(74) *Attorney, Agent, or Firm* — Bruce W. Greenhaus; Francisco Rubio-Campos

(57) ABSTRACT

A BCN network with BCN modems that communicate using predefined messages to establish, optimize and facilitate data communication.

4 Claims, 33 Drawing Sheets

| | Field | Length | Usage |
|---|---|---|---|
| 1902 | Transmit clock | 32 bits | System time when the first bit is transmitted over the medium |
| | Packet type<br><br>1904 | 4 bits | Indicates the type of MAC packet being transmitted<br>0x0 – MAP<br>0x1 – Reservation Request<br>0x2 – Link control<br>0x3 – Ethernet unicast/broadcast<br>0x4 – Port-to-port<br>0x5 – MPEG/DSS<br>0x6 – Vendor proprietary<br>0x7 - 0xF – Reserved |
| | Packet subtype<br><br><br><br><br><br><br><br><br><br><br><br><br><br><br><br><br><br>1906 | 4 bits | If packet_type == MAP<br>    0x0 = Asynch MAP<br>If packet_type == Reservation Request<br>    0x0 = Asynchronous data reservation request<br>If packet_type == Link control<br>    0x0 – Probe A/D Reply<br>    0x1 – Self ID/ Admission Request<br>    0x2 – Admission response<br>    0x3 – Key distribution<br>    0x4 – Dynamic Key distribution<br>    0x5 – Probe A/D reply request<br>    0x6 – General link acknowledgement<br>    0x7 – Link Probe C parameters<br>    0x8 – Vendor Proprietary<br>    0x9 – Tx_power_adj<br>    0xA – Tx_power_adj response<br>    0xB – Tx_power_adj ack<br>    0xC – Tx_power_adj update<br>    0xD – Topology update<br>    0xE – 0xF – reserved<br>If packet_type == port-to-port<br>    0x0 - Ethernet<br>    0x1 – MPEG<br>All other values reserved |
| | version<br><br>1908 | 8 bits | Indicates the MAC specification version implemented by a node.<br><br>0x00 – node complies with this specification<br>All other values Reserved. |
| 1910 | Source node ID | 16 bits | As defined in xxx |
| 1912 | Destination node ID | 16 bits | As defined in xxx |
| 1914 | Packet Length | 16 bits | Length of this MAC packet in bytes, inclusive of the packet header, payload and CRC at the end |
| 1916 | Reserved | 32 bits | |
| 1918 | Header Check Sequence | 16 bits | Header CRC |

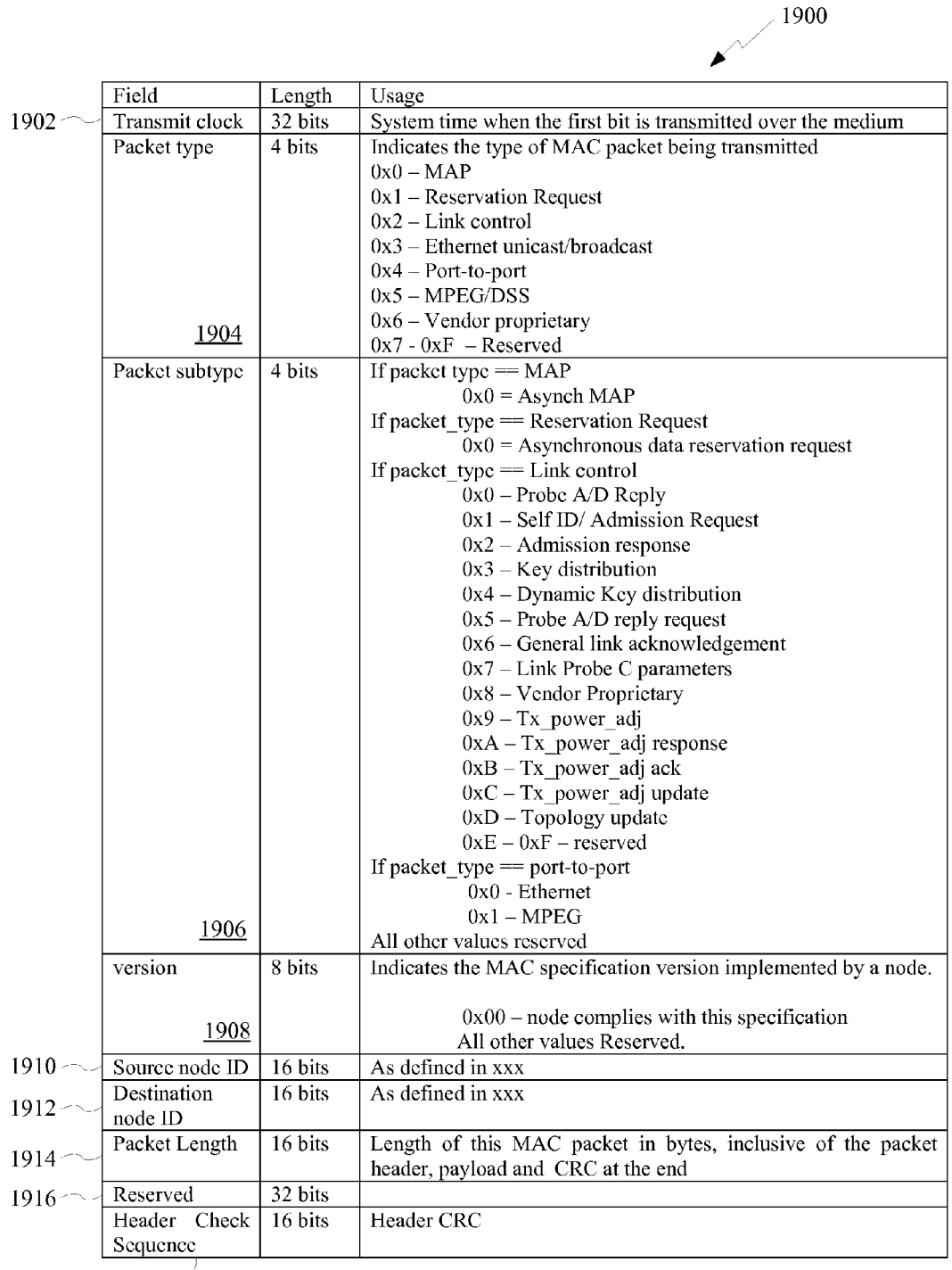

FIG. 19

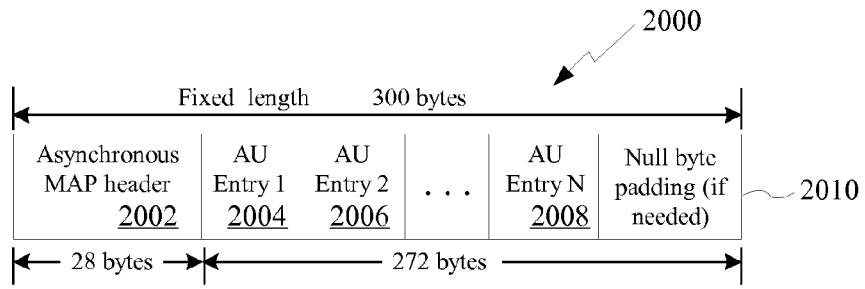

FIG. 20

| Field | Length | Usage | |
|---|---|---|---|
| Valid_from | 32 bits | System time from which the MAP is valid | 2102 |
| Valid_to | 32 bits | System time to which the MAP is valid | 2104 |
| Parameters | 32 bits | Bits used as follows:<br>Bit 31- reserved<br>Bit 30- reserved<br>Bit 29- reserved<br>Bit 28- reserved<br>Bit 27- Encryption_on flag<br>    1 = Encryption on<br>    0 = Reserved<br>Bit 26- TEK_encryption_key_flag<br>    1 = Odd TEK encryption key is in use<br>    0 = Even TEK encryption key is in use<br>Bit 25- PMK_encryption_key_flag<br>    1 = Odd PMK encryption key is in use<br>    0 = Even PMK encryption key is in use<br>Bits 24:0 - reserved | 2106 |
| State | 32 bits | Informs nodes of the state of the network | 2108 |
| Node_bitmask | 32 bits | In each bit position, the bit is set to "1" if the corresponding node is present in the network (implies only 32 nodes in the network) | 2110 |
| Probe source node | 32 bits | Node ID for the node that is up next for sending a Link type A probe. | 2112 |
| Miscellaneous | 32 bits | Miscellaneous data | 2114 |

FIG. 21

| Field | Length | Usage |
|---|---|---|
| Type | 4 bits | Indicates the type of transmission for which the time is being allocated.<br>0x0 = MAP<br>0x1 = Reservation request<br>0x2 = Link control packet<br>0x3 = Ethernet unicast Probe allocation<br>0x4 = Port-to-port message<br>0x5 = MPEG/DSS transmission<br>0x6 = Vendor proprietary format<br>0x7 – 0x9 = reserved<br>0xA = silent allocation<br>0xB = Probe<br>0xC = Beacon<br>0xD – 0xF = reserved |
| Subtype | 4 bits | If packet type == MAP<br>    0x0 = Asynch MAP<br>If packet_type == Reservation Request<br>    0x0 = asynchronous<br>If packet_type == Link control<br>    0x0 – Probe A/D Reply<br>    0x1 – Self ID/ Admission Request<br>    0x2 – Admission response<br>    0x3 – Key distribution<br>    0x4 – Dynamic Key distribution<br>    0x5 – Probe A/D reply request<br>    0x6 – General link Ack<br>    0x7 – Link Probe C parameters<br>    0x8 – Vendor Proprietary<br>    0x9 – Tx_power_adj<br>    0xA – Tx_power_adj response<br>    0xB – Tx_power_adj ack<br>    0xC– Tx_power_adj update<br>    0xD – Topology update<br>    0xE – 0xF – reserved<br>If packet_type == port-to-port<br>    0x0 - Ethernet<br>All other values reserved |
| SRC | 8 bits | ID of source node for the transmission |
| Destination | 8 bits | ID of destination node for the transmission |
| PHY Profile | 8 bits | Indicates the type of modulation scheme used for this transmission<br>bits 7:6<br>    00 = profile sequence 0<br>    01 = profile sequence 1<br>bits 5:0<br>    11111 = Beacon profile<br>    11110 = Diversity mode profile<br>    11101 = Link probe A profile<br>    11100 = Link probe C profile |

FIG. 22A

| Field | Length | Usage | |
|---|---|---|---|
| Code | 8 bits | Indicates type of probe transmission | 2212 |
| source | 8 bits | Node ID of the source node | 2214 |
| Destination | 8 bits | Node ID of the destination node | 2216 |
| Training | 8 bits | | 2218 |
| Miscellaneous | 32 bits | Miscellaneous data | 2220 |
| Sc1 | 8 bits | I believe this probe format is only intended for Type C probes (mandatory transmission capability and optional reception capability) | |
| Sc2 | 8 bits | | |
| Sc3 | 8 bits | | |
| Sc4 | 8 bits | | |
| offset | 32 bits | | 2222 |

FIG. 22B

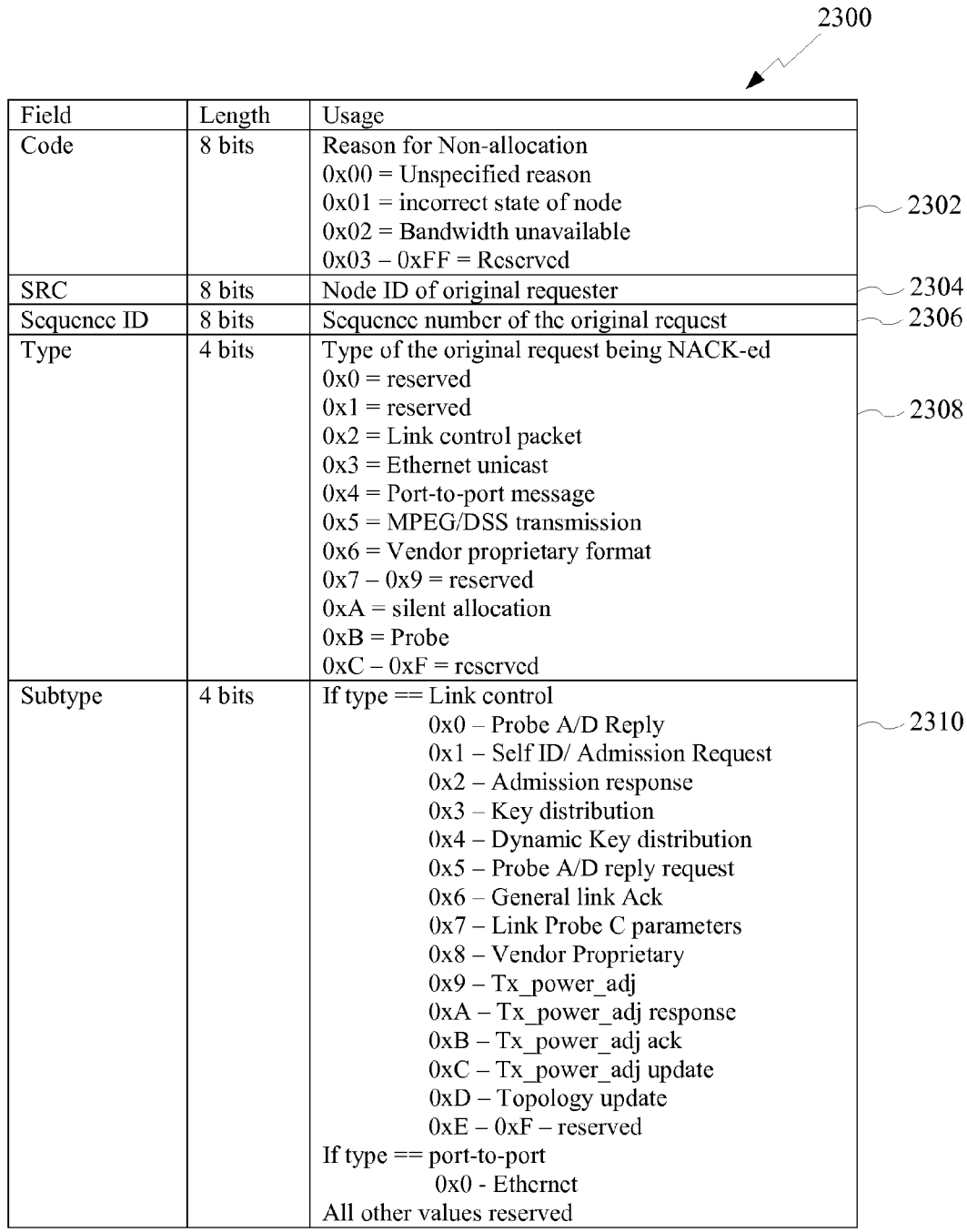

| Field | Length | Usage |
|---|---|---|
| Code | 8 bits | Reason for Non-allocation<br>0x00 = Unspecified reason<br>0x01 = incorrect state of node<br>0x02 = Bandwidth unavailable<br>0x03 – 0xFF = Reserved |
| SRC | 8 bits | Node ID of original requester |
| Sequence ID | 8 bits | Sequence number of the original request |
| Type | 4 bits | Type of the original request being NACK-ed<br>0x0 = reserved<br>0x1 = reserved<br>0x2 = Link control packet<br>0x3 = Ethernet unicast<br>0x4 = Port-to-port message<br>0x5 = MPEG/DSS transmission<br>0x6 = Vendor proprietary format<br>0x7 – 0x9 = reserved<br>0xA = silent allocation<br>0xB = Probe<br>0xC – 0xF = reserved |
| Subtype | 4 bits | If type == Link control<br>    0x0 – Probe A/D Reply<br>    0x1 – Self ID/ Admission Request<br>    0x2 – Admission response<br>    0x3 – Key distribution<br>    0x4 – Dynamic Key distribution<br>    0x5 – Probe A/D reply request<br>    0x6 – General link Ack<br>    0x7 – Link Probe C parameters<br>    0x8 – Vendor Proprietary<br>    0x9 – Tx_power_adj<br>    0xA – Tx_power_adj response<br>    0xB – Tx_power_adj ack<br>    0xC – Tx_power_adj update<br>    0xD – Topology update<br>    0xE – 0xF – reserved<br>If type == port-to-port<br>    0x0 - Ethernet<br>All other values reserved |

FIG. 23

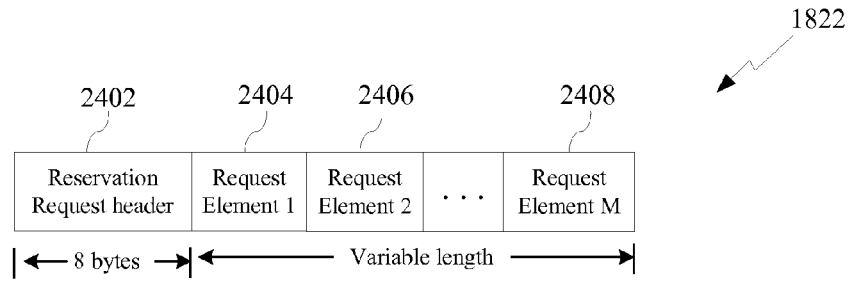

FIG. 24

| Field | Length | Usage | |
|---|---|---|---|
| Num elements | 16 bits | Total number of request elements in the subsequent iteration | 2502 |
| Miscellaneous | 8 bits | Miscellaneous data | 2504 |
| Reserved | 8 bits | | 2506 |
| state | 32 bits | 8 LSBs used to indicate the state of the requesting node<br>0x00 – Network Empty<br>0x01 – Network Admission<br>0x02 – Network TX channel estimate state<br>0x03 – Network RX channel estimate state<br>0x04 – Network Broadcast Bitloading TX state<br>0x05 – Broadcast bitloading update state<br>0x06 – Steady state (Active state)<br>0x07 – Link probe D state<br>0x08 – Link probe A state<br>0x09 – Broadcast bitload TX state<br>0x0A – Broadcast bitload update state | 2508 |
| for<br>i=0,i<Num_elements,i++{ | | | |
| Request element () | Variable bits | Request element can be one of –<br>    Isochronous data – future version<br>    Asynchronous data – 8 bytes long<br>    Link probe – variable length<br>    Link control – 8 bytes long<br>    Port-to-port message – future version | 2510 |
| } | | | |

FIG. 25

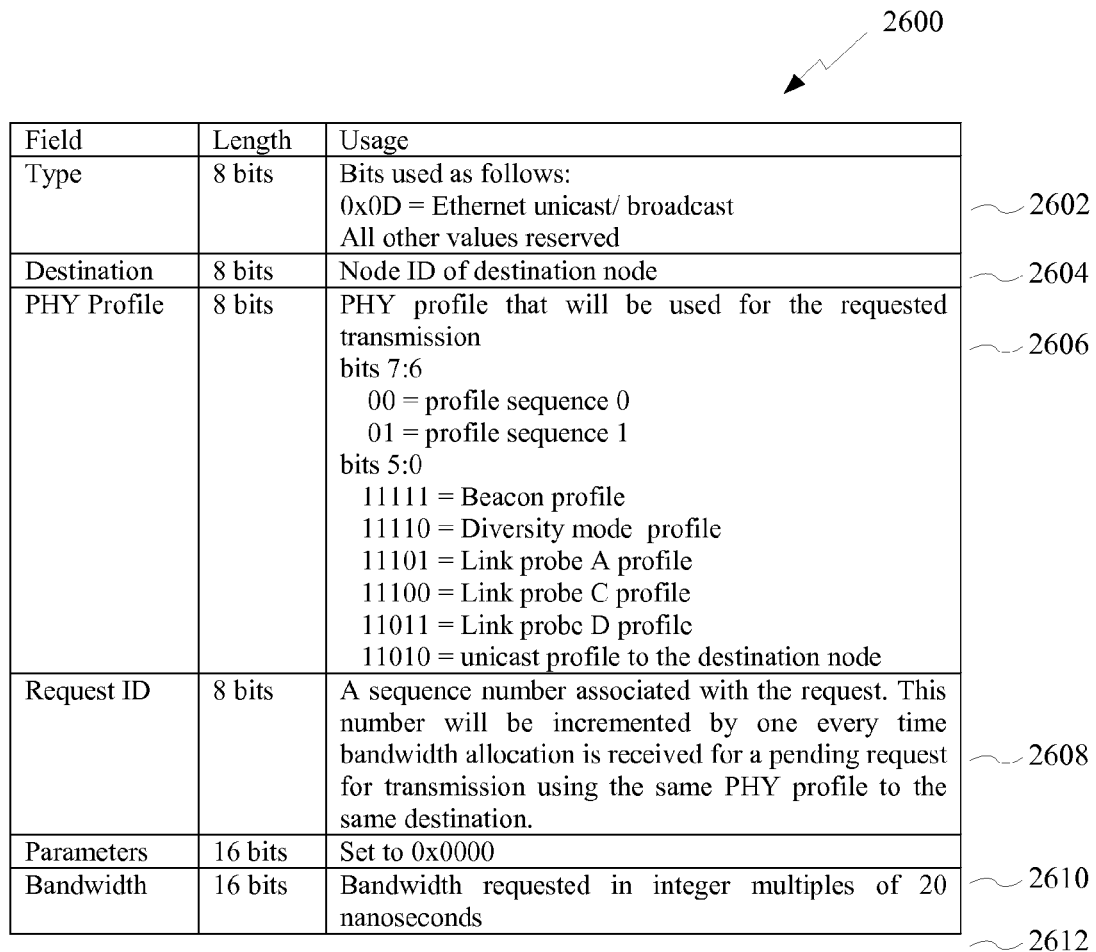

| Field | Length | Usage | |
|---|---|---|---|
| Type | 8 bits | Bits used as follows:<br>0x0D = Ethernet unicast/ broadcast<br>All other values reserved | ~2602 |
| Destination | 8 bits | Node ID of destination node | ~2604 |
| PHY Profile | 8 bits | PHY profile that will be used for the requested transmission<br>bits 7:6<br>    00 = profile sequence 0<br>    01 = profile sequence 1<br>bits 5:0<br>    11111 = Beacon profile<br>    11110 = Diversity mode profile<br>    11101 = Link probe A profile<br>    11100 = Link probe C profile<br>    11011 = Link probe D profile<br>    11010 = unicast profile to the destination node | ~2606 |
| Request ID | 8 bits | A sequence number associated with the request. This number will be incremented by one every time bandwidth allocation is received for a pending request for transmission using the same PHY profile to the same destination. | ~2608 |
| Parameters | 16 bits | Set to 0x0000 | ~2610 |
| Bandwidth | 16 bits | Bandwidth requested in integer multiples of 20 nanoseconds | ~2612 |

| Field | Length | Usage |
|---|---|---|
| Node Protocol support | 16 bits | Bit positions defined as:<br>Bit 0 :<br>    0 = Ethernet not supported<br>    1 = Ethernet supported<br>Bits 1:15 – Reserved | 3002 |
| Reserved | 16 bits | | 3004 |
| GUID | 64 bits | 64 bit MAC address of the device | 3006 |
| Tx power adjustment | 32 bits | This is a decimal number between 0 and 63, indicating the power adjustment value in DB to be used by the NC for subsequent transmissions to the node | 3008 |

| Field | Length | Usage |
|---|---|---|
| Number_of_Nodes | 8 bits | Total number of nodes (including the NC and the newly admitted node) in the network | 3102 |
| Network reset flag | 8 bits | Set to value 0x00 | 3104 |
| Reserved | 16 bits | | 3106 |
| Max Tx power | 32 bits | An integer indicating the maximum value of transmit power adjustment in DB that can be used by the receiving node. | 3108 |
| for (i=0; i<Number_of_nodes; i++) { | | This iteration enumerates all nodes in the network | 3110 |
| Node_ID | 16 bits | ID of a node within the network. New node is listed first in the loop. | 3112 |
| Reserved | 16 bits | | 3114 |
| Node_protocol_support | 16 bits | Protocols supported by the node, as reported by the node during its admission | 3116 |
| Reserved | 16 bits | This field will reflect any changes in a similar reserved field that follows the Node_protocol_support field of an Admission Request PDU. | 3118 |
| Node GUID | 64 bits | 64-bit device ID of the node | 3120 |
| } | | | |

| Syntax | Length | Usage |
|---|---|---|
| Transaction_Type | 8 bits | Type of transaction in the descriptor<br>0x01 = request<br>0x0F = response<br>0xF0 = acknowledgement<br>All other reserved |
| Transaction_ID | 8 bits | Identification number of the descriptor |
| if (transaction_type == response){ | | |
| Number Of Key Blocks | 2 bits | Number of key blocks in this descriptor<br>00 = one key block<br>01 = two key blocks<br>10 = three key blocks<br>11 = four key blocks |
| Reserved | 6 bits | |
| for(i=0;i<Number of key blocks;i++)<br>{ | | |
| Key ID | 4 bits | Type of key as follows<br>0xx0 = PMK even<br>0xx1 = PMK odd<br>1xx0 = TEK even<br>1xx1 = TEK odd |
| Reserved | 4 bits | |
| Key Data | 64 bits | Key used for encryption |
| } | | |
| } | | |
| if (transaction_type == request) { | | |
| Requested Key | 4 bits | Type of key as follows<br>0xx0 = PMK even<br>0xx1 = PMK odd<br>1xx0 = TEK even<br>1xx1 = TEK odd |
| Reserved | 4 bits | |
| } | | |
| if(transaction_type ==Acknowledge)<br>{ | | |
| Key ID being acknowledged | 8 bits | |
| } | | |

FIG. 32

| Field | Length | Usage |
| --- | --- | --- |
| Source Node ID | 16 bits | |
| Destination node ID | 16 bits | |
| TX power adjustment | 32 bits | Decimal value between 0 and 63, represents power gain in DB. |

FIG. 36

| Field | Length | Usage |
| --- | --- | --- |
| Destination node ID | 16 bits | |
| Reserved | 16 bits | |
| TX power adjustment | 32 bits | Decimal value between 0 and 63, represent power adjustment to be used |

FIG. 37

| Field | Length | Usage |
| --- | --- | --- |
| Destination node ID | 16 bits | |
| Max Tx Power | 32 bits | Decimal value between 0 and 63, represent maximum power adjustment permitted for a node |

FIG. 38

| Field | Length | Usage |
| --- | --- | --- |
| Destination node ID | 16 bits | |
| Delta Power adjustment | 8 bits | Decimal value between 0 and 63, represent difference from the previous value |

FIG. 39

| Fields | Length | Usage |
| --- | --- | --- |
| for (i=0; i<N; i++) { | | Length of payload field is the length of the MAC packet as indicated in packet header minus packet CRC and optional timestamps, if present. |
| Data bytes | 8 | |
| } | | |

| Field | Length | Explanation | |
|---|---|---|---|
| IE Type | 5 bits | | 4102 |
| IE length | 3 bits | | |
| Channel Number | 8 bits | | |
| Change Field | 2 bits | | |
| Sequence Number | 6 bits | | |
| Reserved | 8 bits | Added for future use. | 4104 |
| Network information | 8 bits | Added for future use. This field may be used to convey information regarding star/ mesh topology. | 4106 |
| Reserved | 10 bits | | 4108 |
| NCID | 6 bits | Node ID of the Network Coordinator | 4110 |
| Next beacon index | 8 bits | Number of SUs to the next Beacon transmission | 4112 |
| Reserved | 8 bits | | 4114 |
| Admission Frame Length | 16 bits | Duration in units of 20 nsec clock ticks of the following admission request/contention window | 4116 |
| Async MAP length | 16 bits | Duration in 20 nanoseconds. | 4118 |
| Isoch MAP length | 16 bits | Length in bytes or in nanoseconds. | 4120 |
| Admission/robust window PHY profile | 8 bits | PHY profile used for the next admission window | 4122 |
| Admission/ Robust contention Index | 24 bits | Duration in units of 20 nsec to the beginning of the next admission window from the end of this Beacon transmission | 4124 |
| Asynch MAP profile | 8 bits | | 4126 |
| Asynch MAP index | 24 bits | | 4128 |
| Isoch MAP profile | 8 bits | | 4130 |
| Isoch MAP Index | 24 bits | Index of Isoch MAP transmission time in units of 20 nanoseconds | 4132 |
| Beacon CRC | 32 bit | CRC over all bit | 4134 |

FIG. 41

MULTIMEDIA OVER COAXIAL CABLE ACCESS PROTOCOL

REFERENCE TO EARLIER-FILED APPLICATIONS

This application claims priority under Section 119(e) to U.S. Provisional Application Ser. No. 60/632,856 titled "Interface for a Broadband Coaxial Network," filed Dec. 2, 2004, which is incorporated herein, in its entirety, by this reference.

BACKGROUND OF THE INVENTION

1. Field of Invention

The invention relates to broadband communication networks, and in particular to access protocols used in a local area broadband communication networks.

2. Related Art

The worldwide utilization of external television ("TV") antennas for receiving broadcast TV, cable television (CATV), and satellite TV is growing at a rapid pace. These TV signals received via an external TV antenna, cable TV and satellite TV, such as a direct broadcast satellite ("DBS") system, are usually located on the exterior of a building (such as a home or an office) and enter the building at a point-of-entry ("POE"). Multiple TV receivers, audio video receivers, and/or video monitor devices may be located within the building and these multiple devices may be in signal communication with the POE via a broadband cable network that may include a plurality of cables and cable splitters. Generally, these cable splitters are passive devices and distribute downstream signals from the POE to various terminals (also known as "nodes") in the building. The nodes may be various types of customer premise equipment ("CPE") such as cable converter boxes, televisions, video monitors, cable modems, cable phones, audio video receivers, set-top boxes (STBs) and video game consoles.

Within a typical building or home, there may be a mixture of coaxial cables of varying types and quality, such as RG-59, RG-6, and RG-6 quad shield, thus creating a less than optimal RF environment within the cable. Further, typical homes do little or no termination of cable outlets enabling the introduction of RF interference into the coaxial cables. Another problem often encountered with a typical home or building coaxial cable configuration is the use of multiple splitters of varying quality and frequency ranges. This also creates a problem for known approaches to local area networking over coaxial cable. Such networking often requires a more controlled RF environment or higher quality cabling to support higher frequency ranges.

Typically, an STB connects to a coaxial cable at a wall outlet terminal and receives cable TV and/or satellite TV signals. A device, such as the STB, connected to the coaxial cable may be called a node. Usually, the STB receives the cable TV and/or satellite TV signals and converts them into tuned RF TV signals that may be received by the TV receiver and/or video signals that may be received by a video monitor.

In FIG. 1, an example of a known broadband cable network 100 (also known as a "cable system" and/or "cable wiring") is shown within a building 102 (also known as customer premises) such as a typical home or office. The broadband cable system 100 may be in signal communication with an optional cable service provider 104, optional broadcast TV station 106, and/or optional DBS satellite 108, via signal path 110, signal path 112 and external antenna 114, and signal path 116 and DBS antenna 118, respectively. The broadband cable system 100 also may be in signal communication with optional CPEs 120, 122 and 124, via signal paths 126, 128 and 130, respectively.

In FIG. 2, another example of a known broadband cable system is shown within a building (not shown) such as a typical home. The cable system 200 may be in signal communication with a cable provider (not shown), satellite TV dish (not shown), and/or external antenna (not shown) via a signal path 202 such as a main coaxial cable from the building to a cable connection switch (not shown) outside of the building. The cable system 200 may include a multi-tap device (not shown) that allows communication to neighboring homes, a POE to the home 204, N:1 Splitter 206, which in this system may also be considered a Root Node, sub-splitter 208, and node devices 210, 212 and 214.

Within the cable system 200, the Multi-Tap (not shown) may be in signal communication with the Root Node/main splitter 206 via signal path 228. The Root Node/main splitter 206 may be the connection point from the cable provider that is located externally to the building of the cable system 200. The Root Node/main splitter 206 may be implemented as a coaxial cable splitter that may include passive devices and packages including connectors, transformer and/or filters.

The N:1 splitter 206 (a 2:1 splitter in FIG. 2) acts as the main splitter and may be in signal communication with N:1 sub-splitter 208 (a 2:1 splitter in FIG. 2), and node device 210, via signal paths 230 and 232, respectively. The N:1 sub-splitter 208 may be in signal communication with node devices 212 and 214 via signal paths 234 and 236, respectively. The node devices may be comprised of numerous known STB coaxial units such as cable television STBs and/or satellite television STBs, as well as various video and multimedia devices typically found in the home or office. Typically, the signal paths 228, 230, 232, 234, and 236 may be implemented utilizing coaxial cables 216, 218, 220, 222 and 224, respectively.

In an example operation, the cable system 200 would receive CATV, cable and/or satellite radio frequency ("RF") TV signals 226 from the Multi-Tap (not shown) via signal path 216 into the Root Node/main splitter 206. The Root Node/main splitter 206 may pass, transform and/or filter the received RF signals to a second RF signal 230 that may be passed to N:1 sub-splitter 208 via signal path 218. Sub-splitter 208 may then split the second RF signal 230 into split RF signals 234 and 236 that are passed to node devices 212 and 214 via signal paths 222 and 224, respectively. If the node device is an STB, the node device may convert the received split RF signal into a baseband signal (not shown) that may be passed to a video monitor (not shown) in signal communication with the STB. Similarly, the Root Node/Main Splitter passes a second signal 232 via signal path 220 to another node device 210.

In recent years, numerous consumer electronics appliances and software applications have been developed and continue to be developed that are able to receive, store, process and transmit programming information to multiple devices in the home at the time and manner as determined by the viewer. The main drawback to the ability of users to view multimedia information stored on multiple storage devices at the home and view it (or listen to it) on any capable home appliance at the time and manner of his choosing is the lack of a viable home networking solution. There are large numbers and types of CPEs that can be utilized and shared in such a fashion including televisions, video monitors, cable modems, cable phones, video game consoles, and, audio components, as well as various storage devices. There is a growing need for different CPEs to communicate between themselves in a network type of environment within the building. As an example, users in a home may want to share other types of digital data (such as video and/or computer information) between different devices in different rooms of a building.

The present invention is focused on utilizing the home coaxial cable as a medium for high speed home networking by utilizing frequencies above the ones currently used by the Cable Operators for their cable service. The home coaxial cable is a natural medium for connecting multimedia devices since it has an enormous amount of available bandwidth required for the high data rates that are needed for such applications and also, all the multimedia devices and appliances are most likely to be already connected to the coaxial cable. Unfortunately, most broadband cable networks (such as the examples shown in both FIG. 1 and FIG. 2) presently utilized within most existing buildings are not configured to allow for networking between CPEs. Most broadband cable networks utilize broadband cable splitters that are designed to split an incoming signal from the POE into numerous split signals that are passed downstream to the different nodes in different rooms, or equivalently, combine signals from multiple sources (on the "output" ports) to an aggregate on the "input" port. The existing conventional wisdom is that the use of splitters in the existing broadband cable networks make these networks able to communicate only between the "point of entry" 204 and node devices 210, 212, and 214, and prevents direct networking between node devices in the network because signals returning from the node devices cannot be routed back through the splitters, i.e., cannot "jump" a splitter. The present invention describes a system that allows node devices ("CPEs") to communicate directly over the existing coaxial cable with its current architecture without the need to modify the home cable infrastructure.

As an example, in a typical home the signal splitters are commonly coaxial cable splitters that have an input port and multiple output ports. Generally, the input port is known as a common port and the output ports are known as tap ports. These types of splitters are generally passive devices and may be constructed using lumped element circuits with discrete transformers, inductors, capacitors, and resistors and/or using strip-line or microstrip circuits.

Presently many CPEs utilized in modern cable and DBS systems, however, have the ability to transmit as well as receive. If a CPE is capable of transmitting an upstream signal, the transmitted upstream signal from that CPE typically flows through the signal splitters back to the POE and to the cable and/or DBS provider. In this reverse flow direction, the signal splitters function as signal combiners for upstream signals from the CPEs to the POE. Usually, most of the energy from the upstream signals is passed from the CPEs to the POE because the splitters typically have a high level of isolation between the different connected terminals resulting in significant isolation between the various CPEs.

The isolation creates a difficult environment in which to network between the different CPEs because the isolation results in difficulty for transmitting two-way communication data between the different CPEs. However, CPEs are becoming increasingly more capable and a growing number of users desire to network multiple CPEs to share storage and capabilities across the network. As CPEs are networked together in this difficult environment, the problem of coordinating network resources, accesses and optimizing communications between CPEs becomes a necessity.

Therefore, there is a need for a system and method to connect a variety of CPEs into a local data network, such as a local area network ("LAN"), within a building such as a home or office, while utilizing an existing coaxial cable network within the building. Additionally, there is a need for coordinating network resources, access to the network, and to optimize the communication between CPEs.

SUMMARY

A Broadband Coaxial Network (BCN) network formed by a plurality of common coaxial network elements that may include passive splitters and coaxial network nodes where a signal is transmitted from a first BCN modem to one or more other BCN modems with the signal having multiple paths caused by reflected signals from the splitters and coaxial network elements. A Network Controller (NC) BCN modem is established by the activation of the first BCN modem or when there are multiple devices through a selection process. The other BCN modems in the network then communicate with the NC to be admitted to the network and when attempting to access the network and request transmission opportunities to any other node in the network. Each BCN modem communicates with the other BCN modems in the network and establishes the best modulation and other transmission parameters that is optimized and periodically adapted to the channel between each pair of BCN modems. Further, a bridge may be created between a first type of network and a second type of network, such as an Ethernet wiring to a coaxial network wiring.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

FIG. 19 shows a general format of an example header portion of the MAC control/data packet of FIG. 18.

FIG. 20 shows an asynchronous MAP PDU of FIG. 18 with a fixed-length PDU.

FIG. 21 is an illustration of an asynchronous MAP PDU header 2100 of the asynchronous MAP PDU of FIG. 18.

FIGS. 22A&B is an illustration asynchronous MAP allocation unit format.

FIG. 23 is an illustration of a NACK allocation unit.

FIG. 24 is an illustration of a reservation request PDU of FIG. 18.

FIG. 25 is an illustration of the format of the request PDU of FIG. 24.

FIG. 26 shows an asynchronous data reservation request element used in the format of FIG. 25

FIG. 30 is an illustration of an admission request PDU of FIG. 18.

FIG. 31 is an illustration of an admission response PDU of FIG. 18.

FIG. 32 is an illustration of the format of a key distribution PDU of FIG. 18.

FIG. 36 is an illustration of the power adjustment control PDU.

FIG. 37 is an illustration of the power adjustment response PDU.

FIG. 38 is an illustration of the power adjustment acknowledgement PDU.

FIG. 39 is an illustration of the power adjustment update PDU

FIG. 40 is an illustration of an Ethernet data payload of FIG. 18.

FIG. 41 is an illustration of a beacon packet of FIG. 18.

DETAILED DESCRIPTION

In the following description of the exemplar embodiments, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
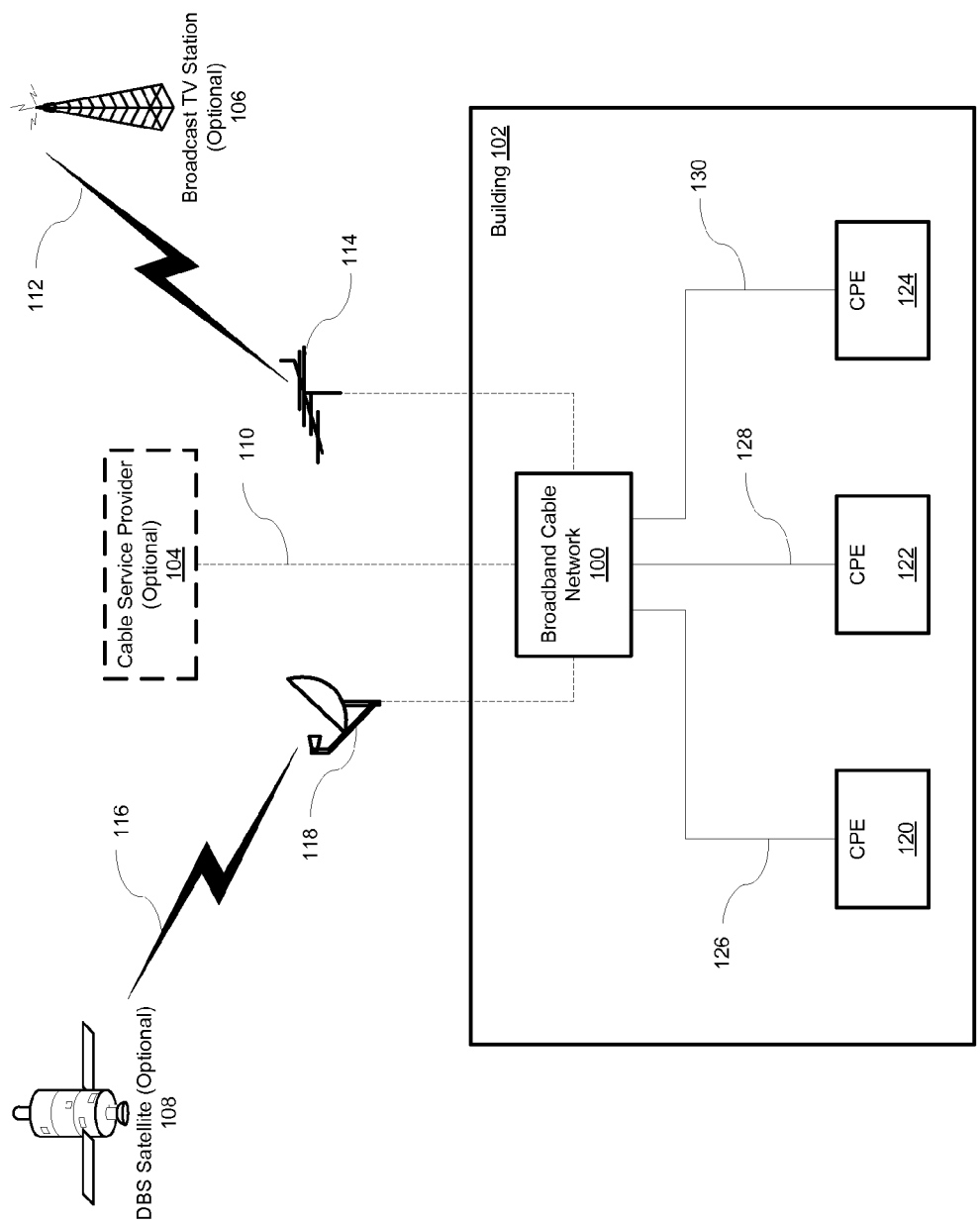
FIG. 1 shows a block diagram of an example implementation of a known broadband cable system within a building.
Figure 2:
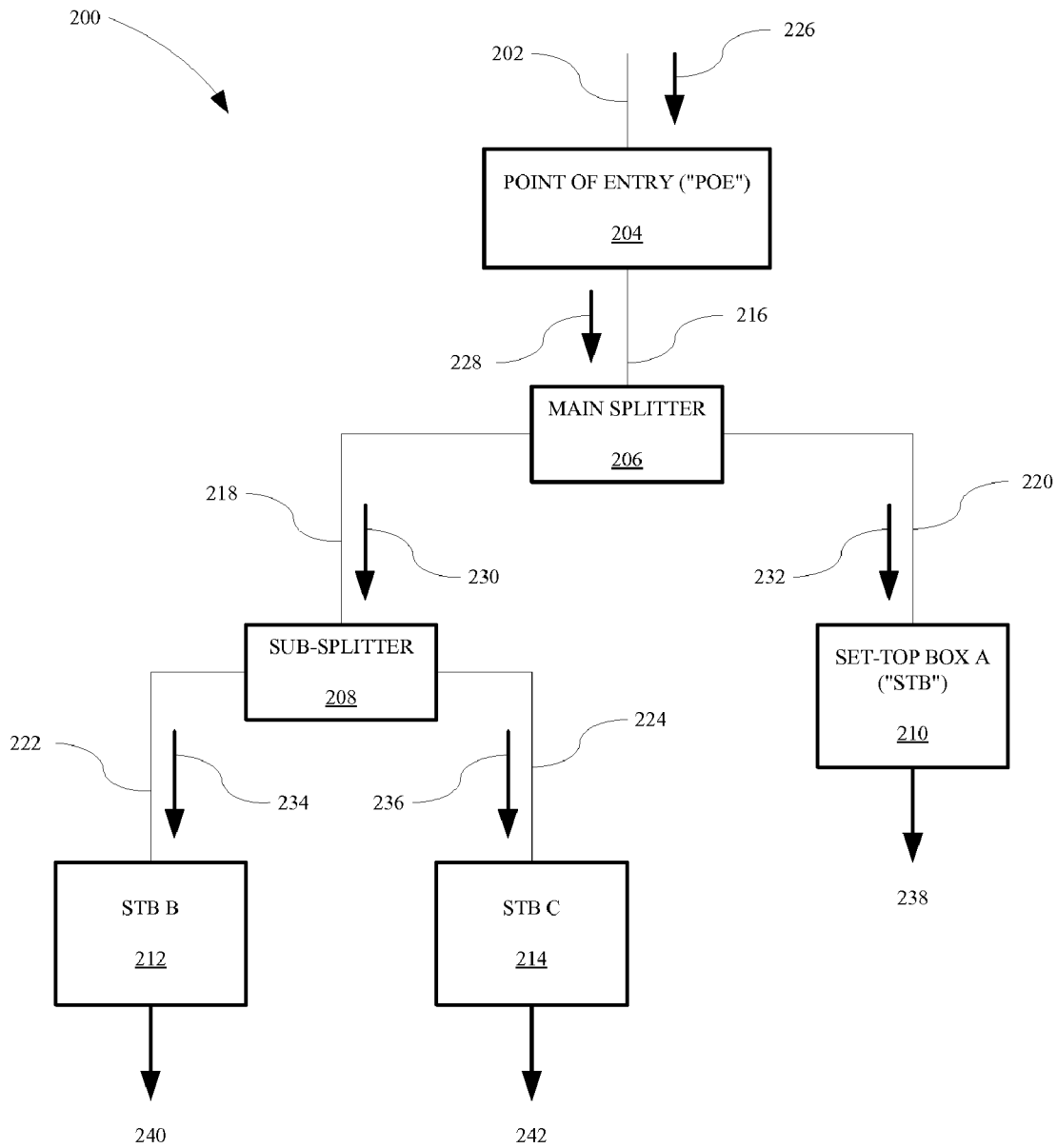
FIG. 2 shows a block diagram of another example implementation of a known broadband cable system within the building shown in FIG. 1.
Figure 3:
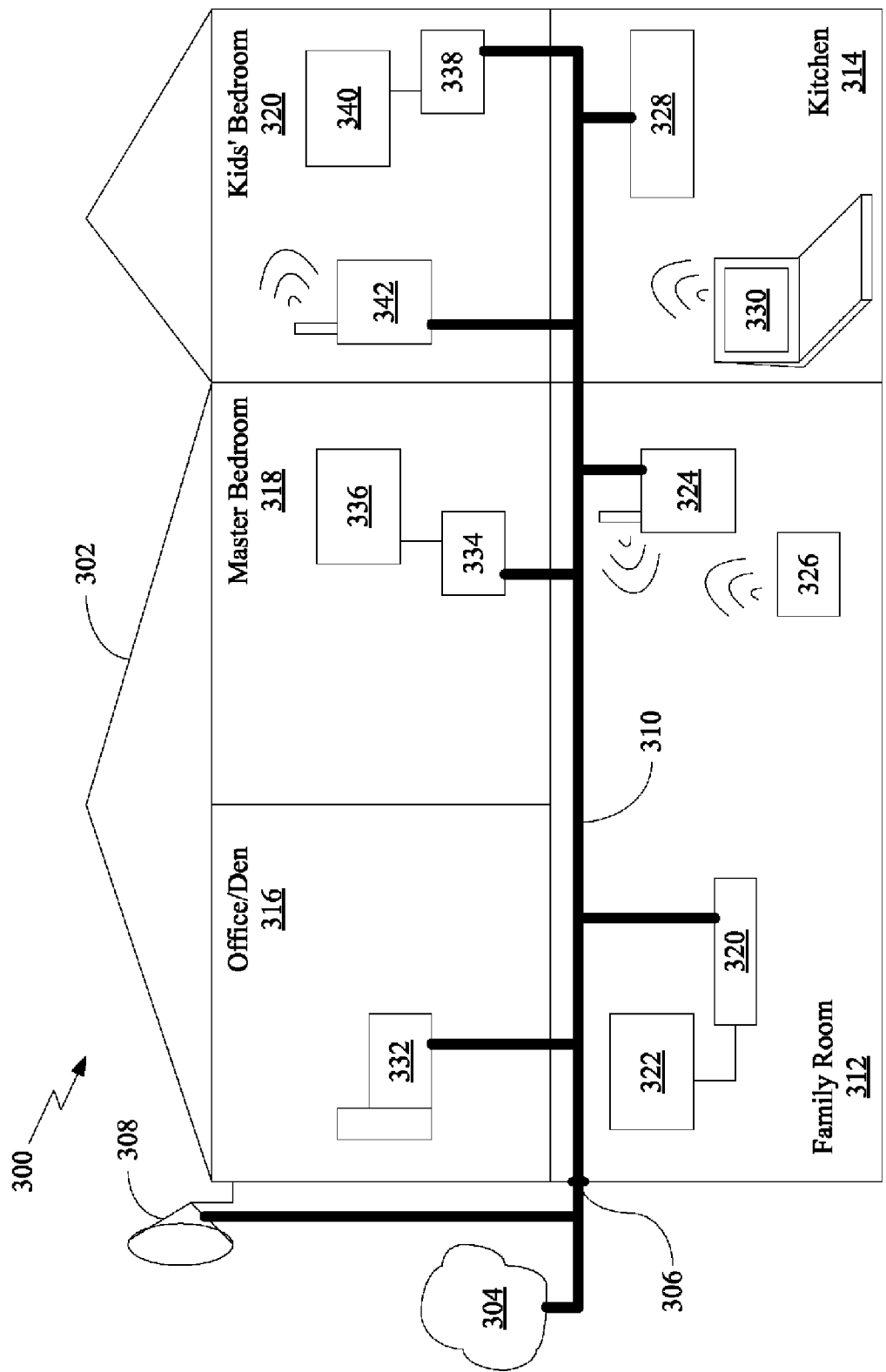
FIG. 3 shows an example of a BCN network within a home or building and its utilization.

Turning to FIG. 3, a diagram 300 of a BCN network within a home or building 302 is shown. A cable/terrestrial network connection 304 is made at a POE 306 in home 302. The home 302 has a satellite dish 308 that may also enter at the POE 306. The satellite dish 308 and cable/terrestrial network 304 may carry data, video, and audio signals that may be encoded as analog signals and/or digital signals.

A BCN network 310 within the home 302 connects with the satellite dish 308 and cable/terrestrial network 304 at POE 306. The BCN network 310 may have connections in different rooms of the home 302, for example, a family room 312, kitchen 314, office/den 316, master bedroom 318, and kids' bedroom 320. In the family room 312, there may be electrical/electronics devices such as a home media server 320 (also denoted as DVRs such as a personal computer, REPLAYTV or TWO) that may be connected to a television (i.e., normal television or high definition) or video monitor 322. Another type of device in the family room 312 connected to the BCN network 310 may be a wireless access point (AP) 324 that communicates with wireless devices such as WebPad 326 using a communication standard such as IEEE 802.11 (a, b, and/or g), or BlueTooth, to name but a few communication standards. In the kitchen 314, a network audio appliance 328, such as a WMA/MP3 Audio Client, may be connected to the BCN network 310. Further, a laptop personal computer 330 having wireless access ability may communicate with the wireless AP 324 located in the family room 312.

The upstairs of home 302 is shown with a media center personal computer 332 connected to the BCN network 310 in the office/den 316. The master bedroom 318 may have a STB 334 that may demodulate an analog or digital signal from a cable headend or a satellite receiver connected to television or video monitor 336. In the kids' bedroom 320, another STB 338 and television or video monitor 340 is shown along with another wireless access point 342 connected to the BCN network 310.

The different types of devices connected to the BCN network 310 are provided as examples of some of the different types of video, data, multimedia, and audio devices that may be typically coupled to the BCN network 310. The BCN network 310 enables two-way communication between network entities such as the media center personal computer 332 and laptop personal computer 330 via the wireless AP 324 or 342. The BCN network 310 may also provide streaming multimedia support to transport audio and video, for example, from the media center PC 332 to the Set-top boxes 334 and/or 338 or any other device connected on the BCN home network 310.

The BCN network 310 may also connect BCN modems that may be present in the different devices shown in FIG. 3 in a peer-to-peer mesh network, such that every BCN modem enabled device can communicate directly with any other BCN modem enabled device on the network. Also, in addition to the peer-to-peer communications, the system can also offer capabilities that may be point-to-multipoint optimized. The BCN modem may be a device that communicates across one or more of multiple RF channels where the communications over each RF channel by the various devices is divided by time, where each device transmits in a different time slot, typically referred to as a time division multiple access (TDMA) communication, and each device transmits or receive at a time denoted as time division duplex (TDD), thus enabling one node to transmit at a time into an assigned TDMA frequency channel.

The BCN modem devices may be classified as Intermediate Devices, Terminal Devices, or both, and Operator Service Provider (OSP) Devices or Non-OSP devices. An intermediate devices device is a device that has as one of its primary functions bridging of user content between the BCN network 300 and an external device over an industry standard interface such as Ethernet or USB. A Terminal Device is a device whose primary function is to source or sink user content over the BCN network 300. Because an intermediate device functions as a bridge between two interfaces, and does not know what data services are being bridged, intermediate devices may have throughput requirements while terminal devices may not. A device may be both an intermediate device and a terminal device.

An Operator-Service Provider (OSP) is an entity that fulfills all of the following requirements of maintaining a WAN infrastructure for delivery of content directly to consumer's homes such as DBS, HFC, FTTH, xDSL, and wireless, delivers or enables delivery of services (video, audio, voice or data) directly to the consumer's home over such WAN infrastructure, provides significant installation and technical support to consumers, including live support and maintenance directly to homes, and significantly advertises such installation and technical support.

Some OSPs may choose to use BCN modems to deliver their WAN and/or LAN services into a customer's home. Because the OSP is responsible for the network, an OSP may be permitted to limit BCN modem functionality in their BCN modems. In particular, the OSP rules ay be:

OSPs may limit his WAN devices to a single channel and is
OSPs are not required to allow sharing of the BCN modem WAN network with other services or BCN modem devices. However, the OSP
OSPs must enable sharing of the OSPs LAN network with non-OSP devices.
OSPs may limit privacy options as long as non-OSP devices may be configured to share the LAN network.

Furthermore, OSPs may have different factory default values from non-OSP devices as long as the non-OSP devices may be configured to share the LAN network.

In the preferred implementation, the BCN network is a multichannel TDMA/TDD system. Even though there is nothing prohibiting a simultaneous use of multiple frequencies on the same logical network, most of the description that follows assumes that the devices that form the network are operating on a single frequency channel. Network operation over multiple frequency channels can be accomplished in several ways. One method can perform transmission opportunities allocations based on both time and frequency. In this case, a given BCN node or modem receives its transmission opportunities on a given frequency channel at a specific time slot. Similarly, it expects to receive designated packets from other stations on a given frequency channel at a given time slot. Another method for multiple frequency channels operations is through the utilization of BCN modem bridges that can bridge single frequency channel networks (or multiple frequency channels networks). It is appreciated by those skilled in the art that the extension of a single frequency channel operation to multiple frequency channels operation is known; therefore this disclosure focuses primarily on a single frequency channel operation. Due to the unique transmission characteristics of the in-home coaxial network, which may include a highly dispersive environment with very large multipath reflections and a potentially different channel response between each pair of BCN modems in either direction, the lower network layer of the BCN network 310, denoted as the physical layer (or PHY layer) may be implemented with a modulation pre-coding (where the modulating waveform is modified to adapt to the channel in a format that is known to the demodulator in most cases) approach such as adaptive (also denoted as bit-loaded) orthogonal frequency division multiplexing (OFDM). OFDM is a modulation technique that splits the modulated waveform into multiple RF sub-channels, each of which is modulated by a portion of the data stream and is sent over a different subcarrier frequency. With the precoded OFDM technique, the system will modulate each of the subcarriers according to the signal-to-noise ratio of each of the subcarriers.

The physical layer may use a modulation technique such as Adaptive Constellation Multi-tone (ACMT). ACMT is a form of orthogonal frequency domain multiplexing (OFDM) where knowledge of the channel is used to select and optimize the modulation. The modulation automatically adapts to the channel characteristics to provide the maximum data rate possible while maintaining low Packet Error Rates (PER). The ACMT modulation can vary from 1 to 8 bits per symbol (i.e. BPSK through 256-QAM) depending on the channel and the capabilities of the node. The term used to describe the modulation of an ACMT transmission is "modulation profile". Other precoding methods besides adaptive OFDM may be used in the BCN network 310 with single broadband carrier systems such as Tomlinson pre-coding or others.

In a typical application, each frequency channel of operation may constitute a separate network of communicating devices. It is also possible to include a network of multiple frequencies, but the operation of such a network requires rapid frequency changes by BCN modems on a packet-by-packet basis. In a single frequency of operation, one of the BCN modems is assigned as the Network Controller (NC) and provides all the necessary information allowing other BCN modems to be admitted to the network, adapt to the network characteristics, synchronize to the network timing and framing, make transmission requests and be able to communicate with some or all of the other BCN modems in the network. In the current approach, the first BCN modem in the BCN network 310 becomes the NC by default and the other BCN modems may be referred to as slave BCN modems. The NC provides network timing synchronization including the timing of admission area for slave BCN modems. When a BCN modem is activated, it attempts to locate the network timing by receiving a beacon identifying network timing and essential network control information including network admission area and other information identifying the time location and characteristics of other important and valid information, such as future beacon locations, future channel assignment information, etc. Any BCN modem that wishes to be admitted to the network then transmits an admission request signal to the NC using the identified admission area. If collision occurs in the admission area between slave BCN modems, then an appropriate back-off algorithm may be used to resolve the collision and enable the colliding slave BCN modems to access the admission area at different times. The back-off algorithm may have the BCN modem wait a predetermined number of beacons. The predetermined number of beacons the BCN modem waits may be a random number between 0 and ($2^n$−1), inclusive, where n is the number of admission requests sent since receiving the first good beacon, up to maximum value of n=5. Otherwise admission to the BCN network 310 may be achieved.

Once a new BCN modem establishes its identity and its communications with the NC, it may start a network admission process that may include several steps, including the optimization of its communications with the NC based on the channel response characteristics between the BCN modem and the NC in either communications direction, the optimization of the transmission characteristics between the BCN modem and any of the other BCN modems already in the network, any calibration requirements to ensure adequate communications, etc. Once admitted to the BCN network 310, the slave BCN modem can communicate efficiently with every other node in the network. The NC BCN modem assigns timeslots to the BCN modem to make requests for transmission opportunities to enable the communication between the slave BCN modem and each of the other nodes in the BCN network 310. Once the slave BCN modem contacts another node, the data path or link between the slave BCN modems and the other nodes may be optimized. By the end of the admission process, the slave BCN modem knows how to transmit efficiently to every other node in the BCN network 310 and subsets of nodes.

In order to manage the BCN network, and control and optimize its operation and enable efficient data transmission in the network, several types of data packets may be used to transmit information. The three most prevalent packet types, for example, are robust packets, probe packets and data transfer packets. The robust packet's main characteristics are that it can be received by any BCN modem in the network even before channels are optimized. The robust packets contain significant redundancy and are transmitted using lower order modulation. The robust packet type is used mainly to broadcast information to all nodes in the BCN network 310 and to enable communications between them before the network is optimized, or to communicate most important control and timing information. One of the robust packets may be called a beacon that may be sent at anytime, no matter the quality of the link, to provide the basic timing and control information that may be required for robust network operation. The robust packets may also transfer original contention and admission information. Another type of robust packet may be used for influencing hardware, i.e., a global reset of all BCN modems in the BCN network 310.

The probe packet type may be used for at least three functions in a BCN network 310. The first use for the probe packet is link optimization. An echo profile probe is sent to determine the distance between significant echoes in the network. The determined distances between the echoes are used to calculate the cyclic prefix that is used in messages to accommodate for the echo and multipath profile of the specific link.

Another probe function may be for hardware calibration. The probe may be used for calibrating the I/Q amplitude and phase Quadrature balance of the up and down conversion process. Typical causes for I/Q imbalance are well known. For example, the phase between the I and Q upconverter and/or downconverter may be off from the optimal 90 degrees, causing an I/Q phase imbalance. Other reasons are unequal signal attenuation and/or delay between the I and the Q signal paths. One can accommodate less stringent I/Q hardware requirements by using probe packets for adaptive calibrations. The probe packet may also be used by requesting a timeslot to be allocated by a NC that may be used by a BCN modem to send packets to itself or other nodes in order to calibrate parameters and circuits, such as power level, filters, in addition to the I/Q transmission signal.

The third type of packet is the data transport packet. The data transport packet is used to transfer data between nodes in the BCN network 310. These packets are denoted as a MAC packet unit (MPU) and are generally adaptively optimized for each transmission link in order to achieve the optimal network throughput.

From a communications services point of view, the BCN network provides both best effort and reserved communications capabilities. It can also support asynchronous and isochronous communications services. In the best effort services, any packet received by a BCN modem for communications over the network requires the BCN modem to make a request to the NC and receive a time allocation grant to transmit the packet. The BCN modem can make requests for data transmission opportunities for more than one packet but the key characteristics of this operation mode is that transmission requests and grants are made based on a packet or multiple packet transmission requirements basis and is of a temporary nature; i.e., no long term data transmission allocations commitments are provided to a BCN modem.

In the reserved mode, certain long-term data transmission requests and grants are made. In this case, the requests and grants may take several forms. A common method may be implemented where a BCN modem node makes a request and is granted a specific allocation for a certain data rate; for example, a BCN modem node may request 10 Mbps channel for a definite or indefinite duration. In this case, the NC controller (or the network, if the allocation is done in a different manner) may allocate certain packet transmission opportunities for this node that will amount to the allocated data rate based on the requested data rate. This allocation may provide for significant time duration until the requested duration expires, no data being transmitted for a predetermined duration, higher priority traffic obtaining the required allocation, or any other network policy that may be implemented according to the nature of the allocations and priorities.

Another method for a reserved channel allocation may include a base allocation (that may be of any size) and additional allocations that may be based on a flow control method that allows the NC to monitor a transmit buffer at the transmitting node (or other traffic requirement indication) and provide variable transmit opportunities according to the transmit buffer load or other indicators. In this case, the fixed reserved allocation can support the effective "average" data rate, while the additional allocations are able to accommodate temporary data rate "peaks." That allows a more efficient utilization of the channel, compared to a case where the reserved allocation is required to accommodate the peak data rate of a given link. Also, even though such reserved bandwidth is allocated on a "long term" basis, it may be readjusted very quickly to accommodate potential changes in the traffic profile.

The NC BCN modem (or the network, in cases where the allocations are performed in a different manner) may also provide asynchronous and isochronous functionality. Its characteristics are similar to those of the best effort and reserved channel communications capability and at times, the terms are used interchangeably. However, with asynchronous and isochronous functionality, the focus is on the timeliness of the services. Asynchronous functionality is similar to the best effort capability discussed above, but the focus is on the indeterminate nature of the timing of delivery. Since this service is in response mostly to a packet delivery that is of random nature, the BCN network does not provide a tight timing control on the latency of packet delivery through the BCN network. Priorities may also be assigned to packets within the BCN network 310 to ensure a priority delivery to certain packets based on IEEE 802.1p priority tags. Packets of higher priority may have preference traversing the network as established by a NC policy. Yet another example of asynchronous functionality may be flow-controlled reservation of timeslots and/or bandwidth for BCN modems. Flow-controlled reservation may include every node being able to communicate the status of its transmission buffer status to the NC BCN modem. The NC BCN modem may give opportunities to transmit even if the other nodes have not requested opportunities for transmission. An isochronous service is similar to the reserved service but the focus is on a tight control on the delivery time and time variation through the network. Certain communications services, such as MPEG Transport Stream (MPEG-TS) may have tight jitter requirements. In order for the BCN network to support such services, its own communications services needs to be able to limit the delay and delay jitter through the BCN network. This can be done through the assignment of a tightly controlled reserved bandwidth allocation.

As discussed in the above sections, the BCN network may offer both asynchronous best effort communications services and isochronous, reserved data transport services. An adaptation layer between other communications services and the BCN network allows it to provide a wide range of communications services over the BCN network and may be implemented in the protocol above a MAC layer for transport. The adaptation layer provides the specific protocol interface to the outside network and adapts it to BCN network transport. It provides all the necessary functions to adapt the specific protocol to be transported over the BCN network. This adaptation may include the same protocol on both sides of the network or may include protocol conversion functionality where one node that may be adapted to one protocol is able to communicate with another node that may be adapted to another protocol. A simple example may include a device with an Ethernet interface to a BCN node communicating with a device with a USB interface to a BCN node. The adaptation layer may transport other protocols, such as Ethernet, MPEG Transport Streams, IEEE 1394, and universal serial bus (USB), data over the BCN network. For example, a native MPEG packet from a MPEG transport stream is 188 bytes long and is transmitted with a defined clocking system, so the packets arrive in a predicted fashion. The 188-byte MPEG2 TS packet or multiple MPEG2 TS packets are placed (or encapsulated) in a BCN packet for transmission between BCN modems. Because a MPEG2 TS packet is always 188 bytes, and its timing of arrival is very well predicted, the bandwidth required in the BCN network 310 may be reserved to match the predicted arrival time and thus, such a packet can be transported over the BCN network very efficiently. Additional data, such as timestamps, may be added to the encapsulated packets without an impact on that data in order to assure a proper timing transfer resulting in an extremely low jitter. Also, the MPEG2-TS adaptation layer can provide Program ID filtering to select just the desired programs for delivery over the BCN network.

Another possible adaptation layer is for Ethernet packets. In this case, the adaptation layer may utilize the BCN network asynchronous protocol to transport Ethernet packets over the BCN network. This adaptation layer may also include the utilization of IEEE 802.1p priorities to provide a preferential transport to higher priority packets.

A third adaptation layer may include IEEE 1394 transport through the BCN network. In this case, the adaptation layer may utilize both the isochronous, reserved allocations of the BCN network protocol to transport the 1394 isochronous packets and the asynchronous service to transport the asynchronous 1394 packets. Also, it can transport the whole 1394 transport through the isochronous, reserved allocations. In a similar fashion, a USB adaptation layer can transport USB packets through the network.

One of the key features of the BCN network is its ability to co-exist with other services over the existing coaxial cable. Such services may include both analog and digital Cable TV services, satellite services and/or terrestrial TV services. In order to minimize the potential for interference by the BCN transmission on the existing services, the BCN modems in the BCN network 310 may use power control in order to manage the interference generated by and to each of the BCN modems by other BCN modems and other devices on the network. Nodes or BCN modems that are close to each other may be subject to a lower attenuation and thus require less power to communicate at a given data rate than nodes that are further apart. The nodes have the ability to adjust transmit power as communication needs dictate in order to achieve the required throughput with potentially lower transmit power. Thus, the interference created by transmitting nodes is minimized in the BCN network 310 without much impact on the total network throughput.

Other power control strategies are also possible. If the network is subject to a significant ingress or other interference from devices in the BCN network, transmitting to an interfered-with node at maximum power may overcome the interference. In this case, the network may deem it necessary to slightly increase the probability of interfering with other devices in the network in order to enable more effective communications with interfered-with nodes. Other nodes that may not suffer the interference may be communicated with only at the nominal or controlled power level.

The BCN network is dynamic and allows the occasional additions and removals of nodes without disruptions of network communications. Each node in the network contains a BCN modem. One of the BCN modems usually assumes the role of a Network Controller ("NC") (which may also be referred to as the Network Coordinator). The NC can be associated with a specific BCN modem (for example, it can be associated with a network gateway or a router) or is dynamically assigned according to certain network rules. In a typical application, the NC BCN modem is established when the first BCN modem is activated in the cable network. In the current implementation, if the NC BCN modem dies or becomes unavailable, a successor takes it place. The successor may be the second BCN modem activated in the cable network and may monitor a signal from the NC BCN modem. Or in other implementations, the successor may be predetermined by a current NC BCN modem based on facts such as link quality with the other BCN modem clients. If the signal is not received for a predetermined amount of time, then the successor becomes an NC for the BCN network 310. If both the first and second BCN modems are unavailable, then either a third designated node (if one exists) may take over or a hunt for an NC occurs between the slave BCN modems based on a defined strategy or in a random fashion with the appropriate back-off strategy to resolve conflicts. In other implementations, the slave BCN modem to take over as an NC may be based on random numbers selection, back-off timers, or similar approaches that vary slave BCN modems determining that an NC is unavailable. This feature may be referred to as NC mobility.

The NC BCN modem is responsible for managing the BCN network 310. The NC BCN modem manages the other clients' BCN access to the BCN network 310 and coordinates assignment of time slots for all BCN modems within a BCN network 310. Additionally, the NC BCN provides synchronization and timing to the other BCN modems in the BCN network 310.

In another implementation, each new BCN modem wishing to join the network listens to the network on a selected frequency channel to see whether there is an NC node on the channel. If there is, the new BCN modem receives the Beacon messages from the NC BCN. The Beacon messages are very robust and can be received even in a very poor channel environment. The Beacon also has information about the admission time slot for the new node and other network control information. If the new BCN modem is authorized to join the network, the transmit admission request in the admission slot announces its presence to the NC. If more than one new BCN modem is trying to access the admission time slot, the request may be unsuccessful and a backup algorithm (a well-known technique) is used for resolution. Once admitted to the network, the new BCN modem continues through the admission process, under the direction of the NC, and communicates with each of the other BCN modems, characterizing each of the possible communication paths to the other BCN modems. Once the paths to the other BCN modems are characterized, then the BCN modem optimizes the communication on each link to maximize transmission/reception efficiency and quality. Further, each BCN modem (including the NC) may periodically probe all the links to the other BCN modems and continually make adjustments to maintain the efficiency and quality. Thus, each path or channel between all BCN modems is individually characterized and optimized, both on admission and periodically thereafter. Also, if a severe communication interruption occurs, the affected node may repeat a process similar to the admission process.

The BCN network may also span across several channel frequencies, where a single NC may control several frequencies, or each frequency may have its own NC. In the first case, the NC may control the access to multiple channel frequencies by controlling not only the time slot allocations of BCN modems in the network but also their operating frequencies. An example of this network may include a NC that controls more than one frequency channel and may assign communications resources to all the BCN modems in the frequencies under its control. Such network may include the assignment of other BCN modems to a given frequency for a certain duration or assign communications resources such as transmission slots and frequencies on a packet-by-packet basis. All other descriptions above are relevant to such an operation as well.

Figure 4:
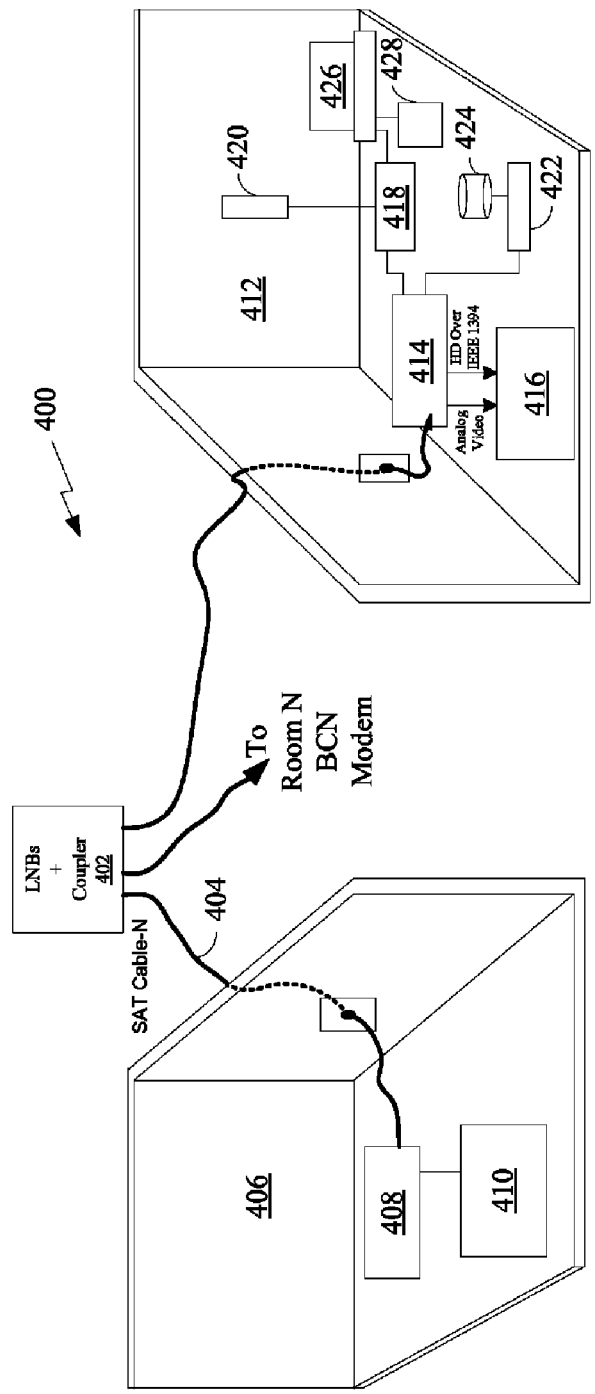
FIG. 4 illustrates two examples of two different architectures for a satellite television system utilizing networking between devices, in this case, utilizing the Satellite cable to form a network between the devices.

Turning to FIG. 4, a satellite television bridging approach that employs the BCN network of FIG. 3 is illustrated in cut-away diagram 400. A satellite LNB+coupler 402 (this may be two or more separate devices that are connected to each other by signal communication, but is shown here as a single entity for convenience) receives and down converts a satellite signal from the frequencies transmitted from the satellite to the antenna (not shown) to frequencies that can be carried over the coaxial cable 404. The signal is carried by a coaxial cable 404 to a room 406 having a STB 408 that tunes, demodulates and decodes the satellite signal into a signal for display on television 410. The STB 408 may be equipped to stream a digitally-encoded video show via a BCN modem located in the STB to another BCN modem in another room. The streamed video may be transmitted from the STB 408 to another room 412 via the LNB+coupler 402. The streamed video may be received at the slave BCN modem 414 that is attached to television 416. The slave BCN modem 414 communicates with other networking devices, such as a router 418, DSL/Cable Modem 420, and an A/V jukebox 422, using a communication standard such as TCP/IP over Ethernet or IEEE 1394 standard. The A/V jukebox 422 may have a network-attached storage (NAS) 424. The router 418 may be connected to a personal computer 426 that communicates via a USB connection with a printer 428.

The satellite signal is received at the LNB+coupler 402 and is then transmitted via the coaxial cable 404 to the STB 408. The STB 408 has 1+N tuners/receivers used to select desired channels. The channel received by the first tuner is demodulated, decoded and is shown on the connected TV (or monitor) 410. The other N tuners may each select a channel and demodulate and decode the signal received at the selected channel as a digital video data stream. The data stream is carried by the BCN network back through the LNB+coupler 402 to the device having the slave BCN modem located in another room 412 for display on television 406 or through the router 418 to be displayed on the personal computer 426. Such transmission of data between devices and rooms may occur to any number of rooms, provided another BCN modem is present on the BCN network in the other rooms. Transmission may be point-to-point or point-to-multipoint. The LNB+coupler 402 provides the means of communication between the various cables 404 connected to it at a certain frequency band or several frequency bands that do not interfere with other signals on these cables. Such frequencies may include both baseband frequencies and RF frequencies.

Figure 5:
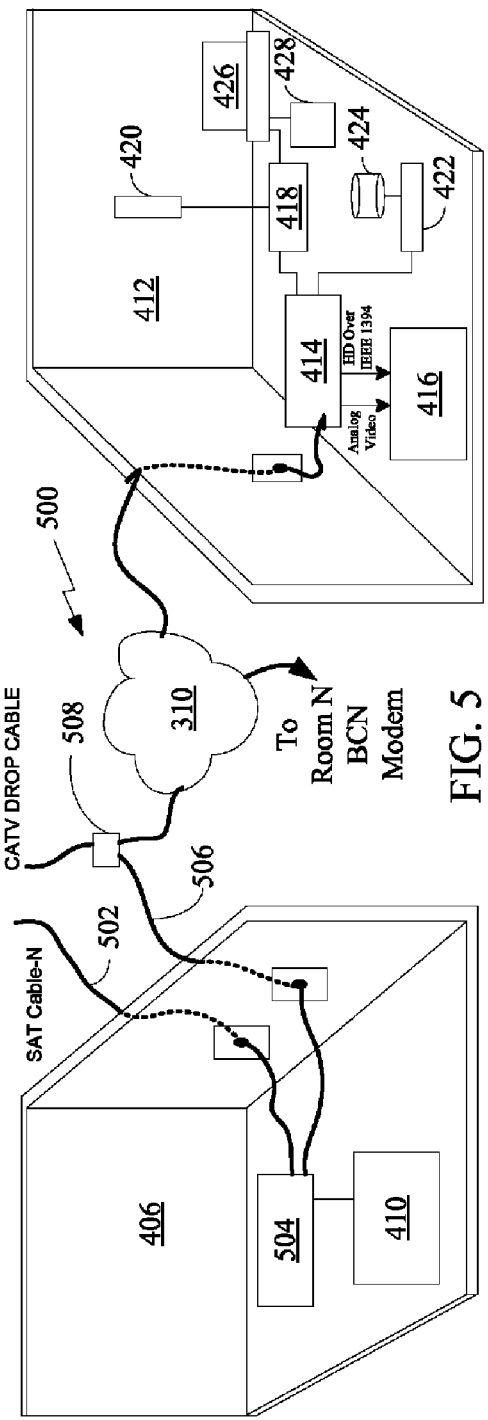
FIG. 5 illustrates another satellite television bridging approach that employs the BCN network of FIG. 3.

In FIG. 5, another satellite television bridging approach that employs the BCN network of FIG. 3 is illustrated in cut-away diagram 500. A cable 502 from a satellite antenna is coupled to a STB 504 having 1+N tuners/receivers. The STB 504 may have a second connection via a BCN modem to the BCN network 310 via cable 506 and cable television (CATV) drop 508. The BCN network 310 has outlets in other rooms, such as 412.

In this implementation, the satellite signal is received at the STB via cable 502. At least one of the 1+N tuners converts the signal into a video signal for display on a local television 410. The other N tuner/receivers tune and demodulate other possible channels where any, some or all demodulated data are then encoded into one or more digital streams and transmitted across the BCN network 310 by the BCN modem enabled device. The digital stream is then received in another room 412 at a device having another BCN modem. The digital stream is then converted and/or RF modulated for display on a television 416 or directly streamed to a personal computer 426. Even though digital streaming of video is used here to demonstrate data transmission across a BCN network, other types of data may be exchanged to transmit and/or receive.

Figure 6:
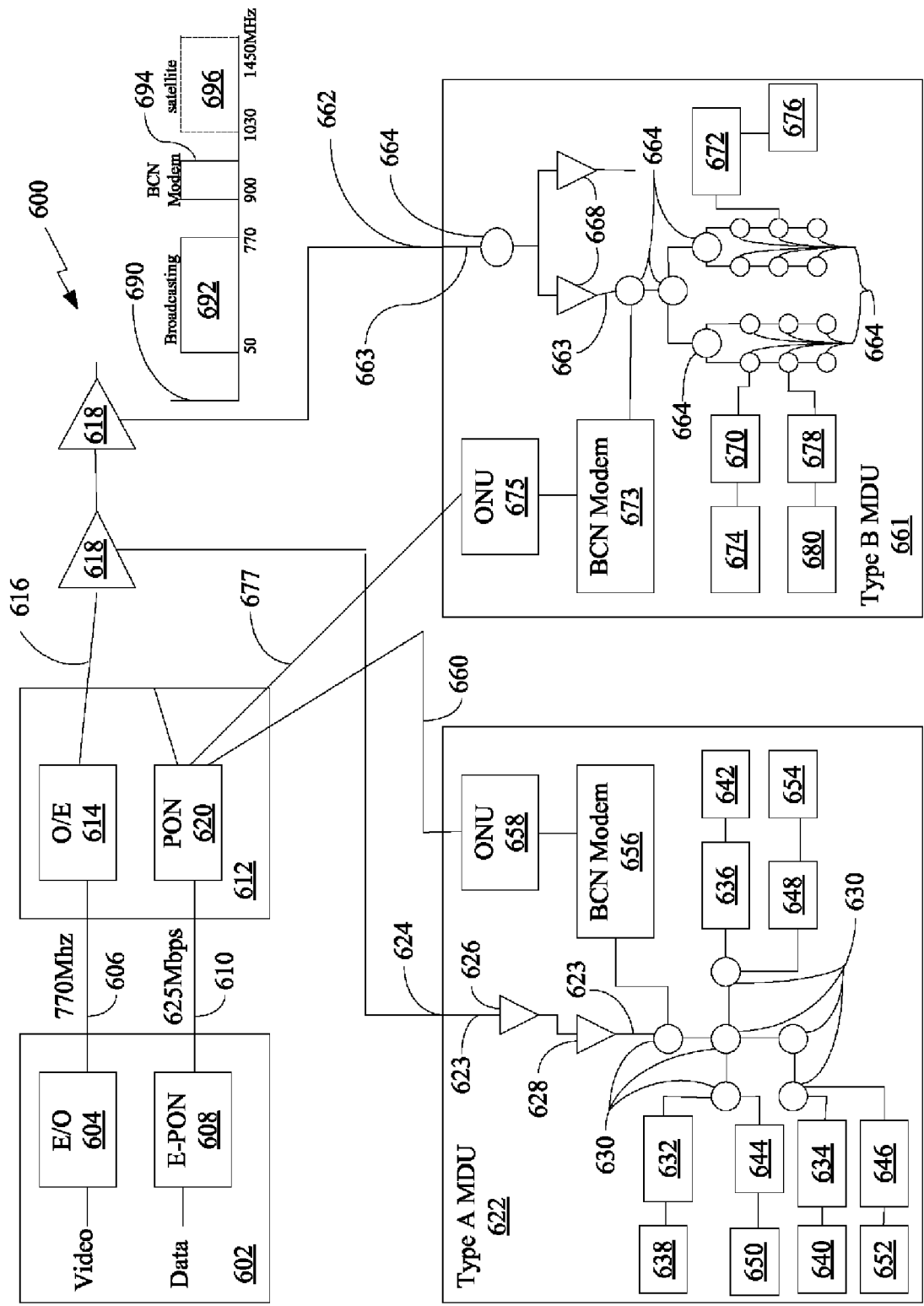
FIG. 6 shows a block diagram of a multiple dwelling implementation that employs another configuration and utilization of a BCN network.

Turning to FIG. 6, a block diagram 600 of a multiple dwelling unit ("MDU") application that employs the BCN network is shown. It is often desirable to provide office buildings and apartment/condominium developments with cost effective data and video services. Such a system may be referred to as an "access type" implementation and is described with a cable television (CATV) headend 602 being a source for reception of video transmission from a provider of video services and connection to other two-way networks for data and video. The CATV headend 602 may have a fiber optical encoder 604 that encodes a single or multiple analog or digital video signals onto an optical physical transport medium, such as multimode fiber-optic cable 606. The headend 602 may also have an Ethernet to passive optical network ("E-PON") transceiver 608 that converts Ethernet data for transmission over a fiber-optic cable 610. The fiber-optic cables 606 and 610 may be terminated at a hybrid fiber-optic cable ("HFC") node 612.

The HFC node 612 may have an Optical to Electrical converter 614 to decode the received video signal for transmission over a coaxial cable 616. The coaxial cable 616 may have one or more amplifiers 618 to maintain the necessary transmitted signal strength range along the coaxial distribution. A passive optical network ("PON") splitter 620 may split the optical signal to multiple location terminations, e.g., 16 terminations.

At least two different access implementation examples in a MDU are shown where data may be supplied by fiber-optic cable to the MDU and distributed to the different units on the coaxial cable typically used for video services, such as cable television distribution. The first example, referred to as "Type A MDU" dwelling 622, has a POE 624 to the dwelling 622. The coaxial cable within the dwelling 622 forms the BCN network 623. Often within the dwelling 622, one or more amplifiers 626, 628 are installed along with one or more passive splitters 630 to form the BCN network 623. The BCN network 623 is connected to BCN modems 632, 634, and 636 that enable Ethernet traffic to be carried over the BCN network 623. The BCN modem 632 may be connected to a personal computer (PC) 638, as BCN modem 634 is connected to PC 640, and BCN modem 636 to PC 642. The BCN network may also carry analog or digital video signals to set-top boxes 644, 646, and 648 that may be connected to televisions 650, 652, and 654, respectively.

The BCN network 623 is connected to the Internet via a BCN modem enabled Ethernet hub 656 that is shown connected to an optical network unit (ONU) 658 that functions as a transceiver on the fiber-optic cable 660 connected to PON 620. Thus downstream video and audio signals are transmitted via the HFC node 612 to the dwelling 622. A two-way data path exists from the ONU 658 to the E-PON 608 located at the headend 602.

The "Type A" MDU implementation enables multiple units, e.g., 32 units in the example embodiment, to share the BCN modem enabled Ethernet hub 656 and ONU 658. The communication between devices, such as PCs 638 and 640 in the "Type A" implementation, flows through the PON 620 and headend 602. This is in contrast to the single home BCN network, shown in FIG. 3, where devices within the home communicate directly with each other.

In the other implementation example, "Type B" MDU 661 has a coaxial cable POE 662 connected to the internal coaxial network 663. The internal coaxial network 663 may have passive elements such as splitters 664. The coaxial network 663 may have BCN modems 670 and 672 connected to PCs 674 and 676, respectively, or other Ethernet enabled devices. The BCN modems 670 and 672 communicate with the BCN modem enabled hub 673 that is coupled to the ONU 675 for bi-directional communication with the PON 620 via a fiber optical cable 677. One or more STBs, such as 678, may be connected to televisions, such as 680, and the coaxial network 663. Unlike the "Type A" MDU 622 implementation, the "Type B" MDU 661 implementation has some units with access to the BCN Modem enabled hub 673 while others only receive the traditional features provided by a cable company.

Within either the "Type A" or Type B" MDU implementations, the coaxial cable may employ a frequency plan 690 that uses 50-770 MHz 692 for broadcasting of video and audio signals. Another area of the frequency plan 690 employs a 50 MHz bandwidth 694 at approximately 900 MHz for use by the BCN modems. The upper end of the frequency band 1030 MHz-1450 MHz 696 may be used by satellite television systems, such as DIRECTV.

The BCN modems are able to create a BCN network while supporting features such as high definition television, Dolby 5.1 digital audio, parental control systems, return channels (remote or interactive television), and Internet data. They enable CPE devices that are TCP/IP enabled, or utilize other protocols, to communicate across the BCN network by communicating with a BCN modem that receives the data via a communication protocol, such as TCP/IP, and converts the TCP/IP signal into a signal for transmission across the BCN network.

The BCN modems may also use encryption algorithms to encrypt data to be transmitted across the BCN network. The transmitted data is then decrypted at the receiving BCN modem for delivery to another CPE. The encryption may be DES based or use other encryption algorithms such as IP-SEC, etc. Various keying systems can be used and the various keying methods are well established in various standards, such as IEEE 802.11, Docsis, and others, and need not be detailed herein.

Figure 7:
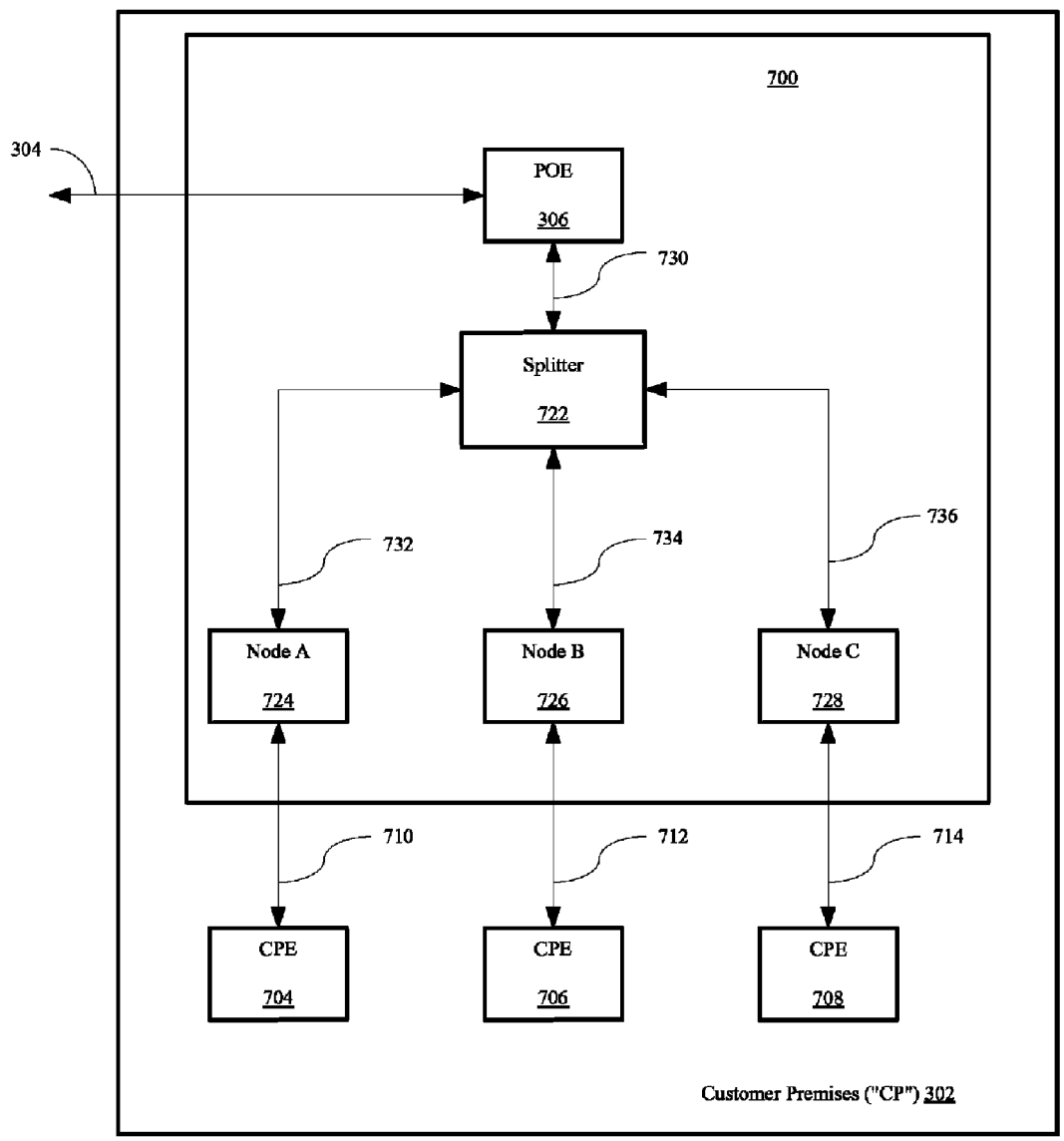
FIG. 7 shows a block diagram of the BCN network of FIG. 3.

In FIG. 7, a block diagram 700 of a BCN network similar to that of FIG. 3 is shown. The coaxial cable 304 enters the premises at the POE 306. One or more passive splitters, such as passive splitter 722 may be in the BCN network 310, FIG. 3. The splitter 722 splits the signals in coaxial cable 730 into multiple coaxial cable lines 732, 734, and 736. The coaxial cable line 732 is coupled to Node A 724, coaxial cable line 734 is coupled to Node B 726, and coaxial cable line 736 is coupled to Node C 728. Each Node may have a BCN modem that transmits and receives TCP/IP (or other protocols) data over their respective coaxial cable lines 732, 734, or 736. The BCN modem also converts the data from/to a physical layer and link layers transmitted on the twisted pair Ethernet cable lines 710, 712, and 714, to the BCN network. The cable lines 710, 712 and 714 may also be USB cables, IEEE 1394 cables or any other communication connections, including printed circuit board communication lines or even communication wires inside integrated circuits. These cable lines represent any communications methods, including all layers of the communications protocol, which are then translated at Nodes A 724, B 726, and C 728, prior to transmission over the BCN network. Each CPE 704, 706, and 708 may be connected to an Ethernet cable 710, 712, and 714, respectively (or other communications methods). The different CPEs 704, 706 and 708 may communicate over the BCN network across the splitter 722.

Figure 8:
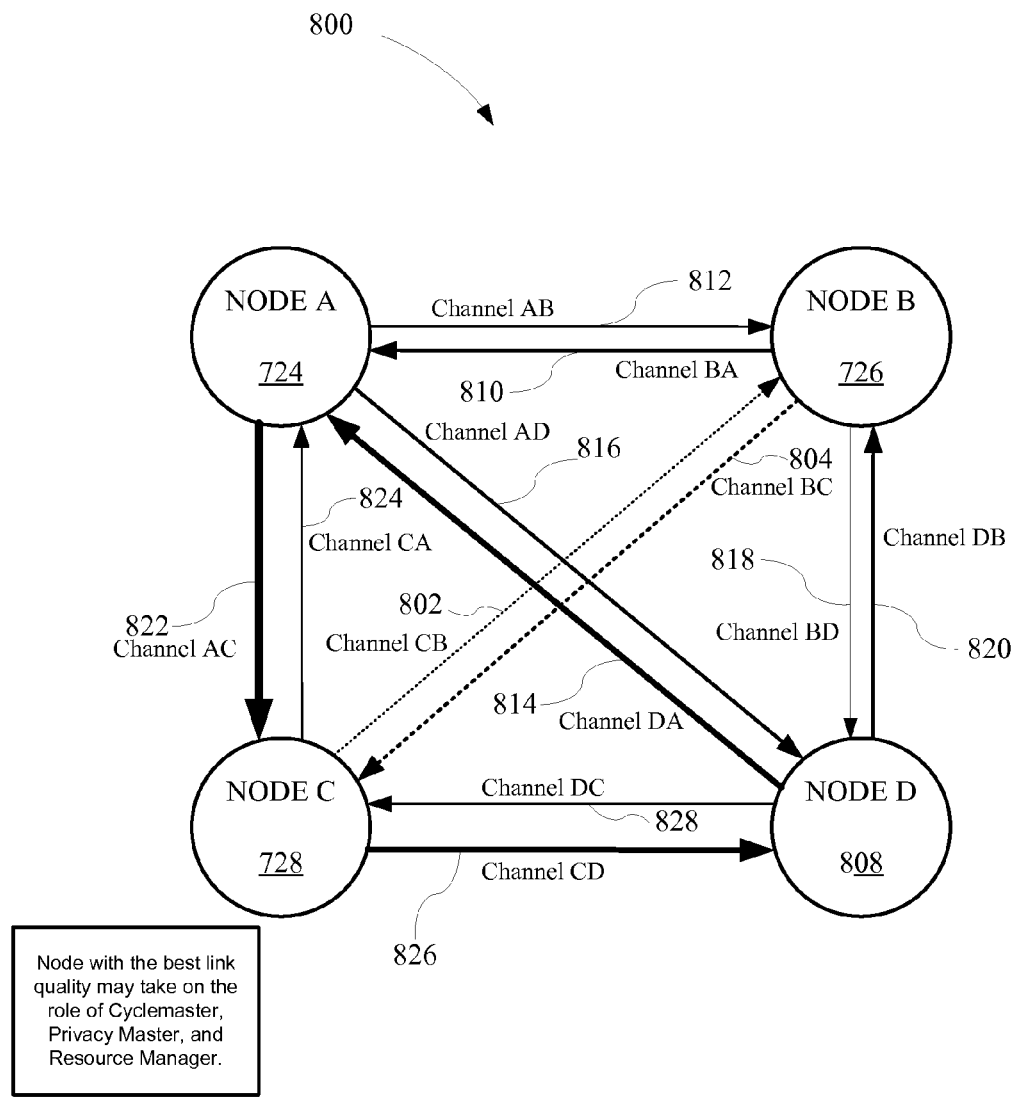
FIG. 8 is an illustration of a functional diagram showing the communication between various nodes of a network similar to the one shown in FIG. 3.

In FIG. 8, a functional diagram 800 showing the logical communication between various nodes, Node A 724, Node B 726, Node C 728, and Node D 808, in the form of a virtual logical mesh network is shown. The nodes 724, 726, 728, and 808 may be interconnected between node pairs utilizing corresponding inter-node channels between the node pairs. It is appreciated by those skilled in the art that even if the nodes are individually connected with one another via a single inter-node channel between the node pairs, each inter-node channel between node pairs may be asymmetric. Therefore, inter-node channels between Node A 724, Node B 726, Node C 728 and Node D 808 may be asymmetric and may require different modulation schemes for optimizing the specific link. Such optimization may be a different bit-loading scheme in an OFDM-based communications system or some other optimized method that optimizes the communications based on the specific channel available, which may be different on one physical link, depending on the direction of the signals between the nodes. As a result, the typically asymmetric inter-node channels between Node A 724, Node B 726, Node C 728, and Node D 808 may be described by the corresponding direction-dependent node channels AB, BA, AC, CA, BC, CB, AD, DA, BD, DB, CD, and DC.

As an example, Node A 724 is in signal communication with Node B 726 via signal paths 810 and 812. Signal path 812 corresponds to the AB channel and signal path 810 corresponds to the BA channel. Additionally, Node A 724 is also in signal communication with Node C 728 via signal paths 822 and 824. Signal path 822 corresponds to the AC channel and signal path 824 corresponds to the CA channel. Similarly, Node B 726 is also in signal communication with Node C 728 via signal paths 802 and 804. Signal path 804 corresponds to the BC channel and signal path 802 corresponds to the CB channel.

In this example, the AB channel corresponds to the channel utilized by Node A 724 transmitting to Node B 726 along signal path 812. The BA channel corresponds to the reverse channel utilized by Node B 726 transmitting to Node A 724 along signal path 810. Similarly, the AC channel corresponds to the channel utilized by Node A 724 transmitting to Node C 728 along signal path 822. The CA channel corresponds to the reverse channel utilized by Node C 728 transmitting to Node A 724 along signal path 824.

Because all links are individually optimized to maximize the throughput on each link, a multicast or a broadcast transmission is problematic. In an example of operation, in order for Node A 724 to transmit the same message to both Node B 726 and Node C 728 using the AB channel along signal path 812 and the AC channel along signal path 822, Node A 724 may need to transmit (i.e., "unicast") the same message twice, once to Node B 726 and a second time to Node C 728 if the channel pre-coding makes the optimized signal waveform on the AC channel quite different from that of the AB channel. Since the nature of communicating on the network may include a significant percentage of multicast/broadcast communications, this may have a significant impact on network efficiency if similar messages need to be repeated on each optimized link.

To maximize the network efficiency even for multicast and broadcast traffic profiles, each of the nodes utilizes the individual link optimization into a combined link optimization as follows; when a node, such as Node A, joins the network, it optimizes its transmission to each of the other nodes in the network. This optimized link is stored in the node's storage. Once a node wishes to transmit a certain message to multiple other nodes, it may do it by repeating the message multiple times or computing an optimal "multicast" transmission profile from the individual profiles in its memory. The node may also utilize a hybrid scheme if a better throughput can be achieved. In such a hybrid scheme, the node may decide to break the nodes it wishes to send the same message to into subsets of nodes that may share largely similar channel characteristics. Each of these subsets will utilize a specifically optimized channel transmission and the same message will be transmitted to all such subset groups. In actual operation, it may be that most messaging will be unicast or broadcast, so that in addition to the individually optimized transmission to each of the other nodes in the network, only a broadcast optimized transmission may be necessary. The preferred implementation of the optimized multicast or broadcast scheme in the proposed network takes advantage of the preferred bit-loaded OFDM scheme and utilizes a combined bit-loading for the subset of the channels to which a node wants to send the common message. This method is described further in the following sections.

The network topology shown in FIG. 8 is a full-mesh peer-to-peer network. The BCN modem may utilize other forms of network topology, which may include a partial-mesh network, a star network, or a combination thereof. Because in a star network, communications are always between a central node and the network nodes only, the optimized transmission is performed between the central node and the other network nodes only, and in the preferred optimization, the bit-loading scheme is established between the central node device acting as the NC and each of the remaining nodes in the network.

The BCN modems may automatically be configured as either a NC or a slave during startup. Each BCN modem is capable of transmitting and receiving on a selected control and/or broadcast channel using what is commonly referred to as precoding. The selected broadcast channel is selected as a channel having sufficient quality to enable all BCN modems to communicate with the NC.

If a BCN modem is started and it does not detect a control channel with a NC BCN modem, then it assumes the role of a NC. Otherwise a NC BCN modem is detected and the BCN modem starting up is configured as a slave BCN modem. For example, when Node A 724 starts up first and assumes the role of NC, the other Nodes B 726 and Node C 728 start up later as slave BCN modems. If two or more BCN modem start up at the same time, a random back-off timer may be used to stagger the establishment of a NC BCN modem. Further, if the network is divided, a BCN modem slave will determine that no NC is present and assume the role of the NC.

Once a NC, such as Node A, is established, the quality of the data paths to and between the other nodes is determined. There may be multiple communications paths between Node A and the other nodes due to the signal reflections that may occur at splitters and other network connections. The data paths for communication between selected nodes are determined and the paths between one node to multiple nodes commonly called multicast are determined. It may not be true that the best signal quality path for a pair of nodes will be the best quality for a multicast to the pair of nodes and one or more other nodes. Often there may be a common channel that has an acceptable quality for all the nodes involved in the multicast.

The multicasting is typically setup at the link layer of the protocol with a multicast group and members join and leave the group as required. A multicast address translation protocol may map up to 64 multicast channels to unique BCN modem channels. Further, either the NC or slave BCN modem may initiate a multicast session.

Figure 9:
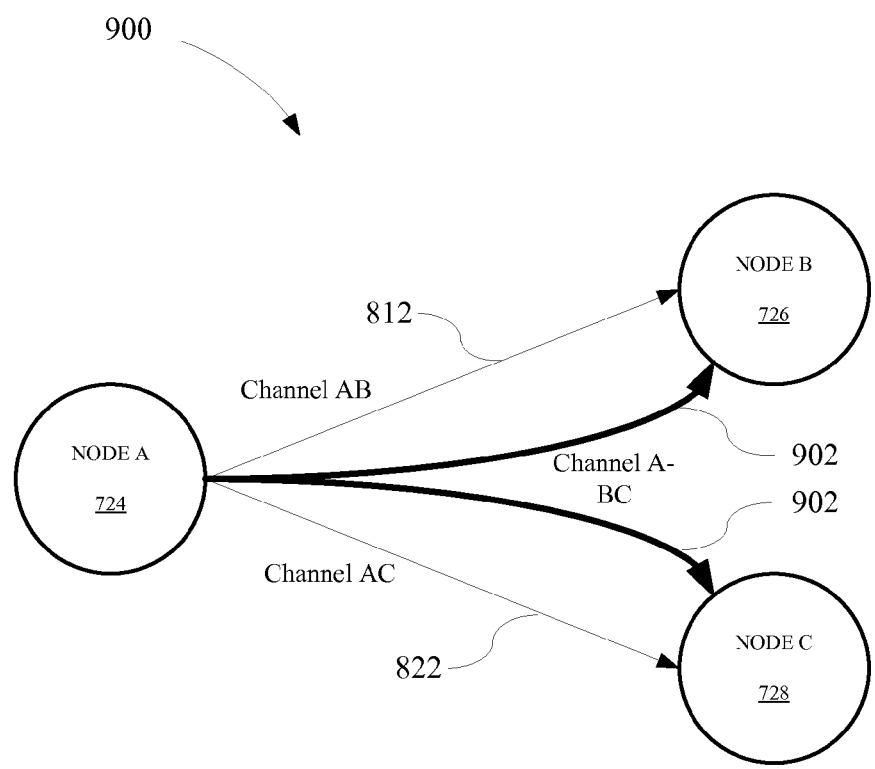
FIG. 9 is another functional diagram showing the interfaces and functional relationships between the Nodes of a network similar to the one shown in FIG. 3.

In FIG. 9, another functional diagram 900 showing the interfaces and functional relationships between the Nodes of FIG. 3 is shown. In this diagram, Node A 724 may transmit a message in broadcast or multicast mode simultaneously to Node B 726 and Node C 728 channel via signal paths 812 and 822, respectively. When the network was established, Node A 724 had optimized its communications with Node B 726 as channel AB. Also, Node A 724 optimized its communications with Node C 728 as channel AC. If Node A 724 needs to transmit a message to Node B 726 or Node C 728, it utilizes the optimized transmission for channel AB or channel AC, respectively. However, once Node A 724 wishes to transmit a message to both Node B 726 and Node C 728 simultaneously, it may not be able to do it effectively if the optimized transmissions for channel AB and channel AC are different. Node A 724 may transmit the message twice, once to Node B 726 with an optimized transmission to channel AB, and once to Node C 728, with an optimized transmission to channel AC. However, analysis has shown that there is a better and more efficient way to transmit the same message to both Nodes B 726 and C 728. Node A 724 can optimize the transmission to a new channel denoted as channel A-BC. This optimized transmission may be the best transmission for messages destined to both Nodes B 726 and C 728. Extensive analysis on models of real cable systems have shown that in most cases, such method is preferred and yields a better throughput compared to repeating the message for optimized channels AB and AC. In the implementation discussed herein, the optimization for channel A-BC is relatively straightforward. Because each of the optimizations for channel AB and channel AC are done by bit-loading according to the frequency responses of paths 812 and 822, channel A-BC optimized transmission is the one that optimizes the bit-loading for the combined response of paths 812 and 813.

It is appreciated by those skilled in the art that the different channels typically utilize different bit-loading modulation schemes, because the channels typically are physically and electrically different in the BCN network. Physically the channels often vary in length between nodes and electrically vary because of the paths through and the reflections from the various cables, switches, terminals, connections, and other electrical components in the BCN network. A bit-loading scheme is described in U.S. Utility application Ser. No. 10/322,834 titled "Broadband Network for Coaxial Cable Using Multi-carrier Modulation," filed Dec. 18, 2002, which is incorporated herein, in its entirety, by this reference.

In another implementation, the BCN network may operate with waveforms that utilize bit-loaded orthogonal frequency division multiplexing (OFDM). Therefore, the BCN network may transmit multiple carrier signals with different QAM constellations on each carrier. As an example, over a bandwidth of about 50 MHz, the BCN network may have 256 different carriers that in the best circumstances would utilize up to 256 QAM modulations. However, the modulation of each carrier may be adjusted according to the specific channel response. If at certain frequencies, the response is poor, the BCN network may utilize BPSK or a low order QAM for carriers in those frequencies. If the channel is good in some other frequencies, then a high order QAM can be utilized on those frequencies, which is the essence of bit-loading optimization.

Figure 10:
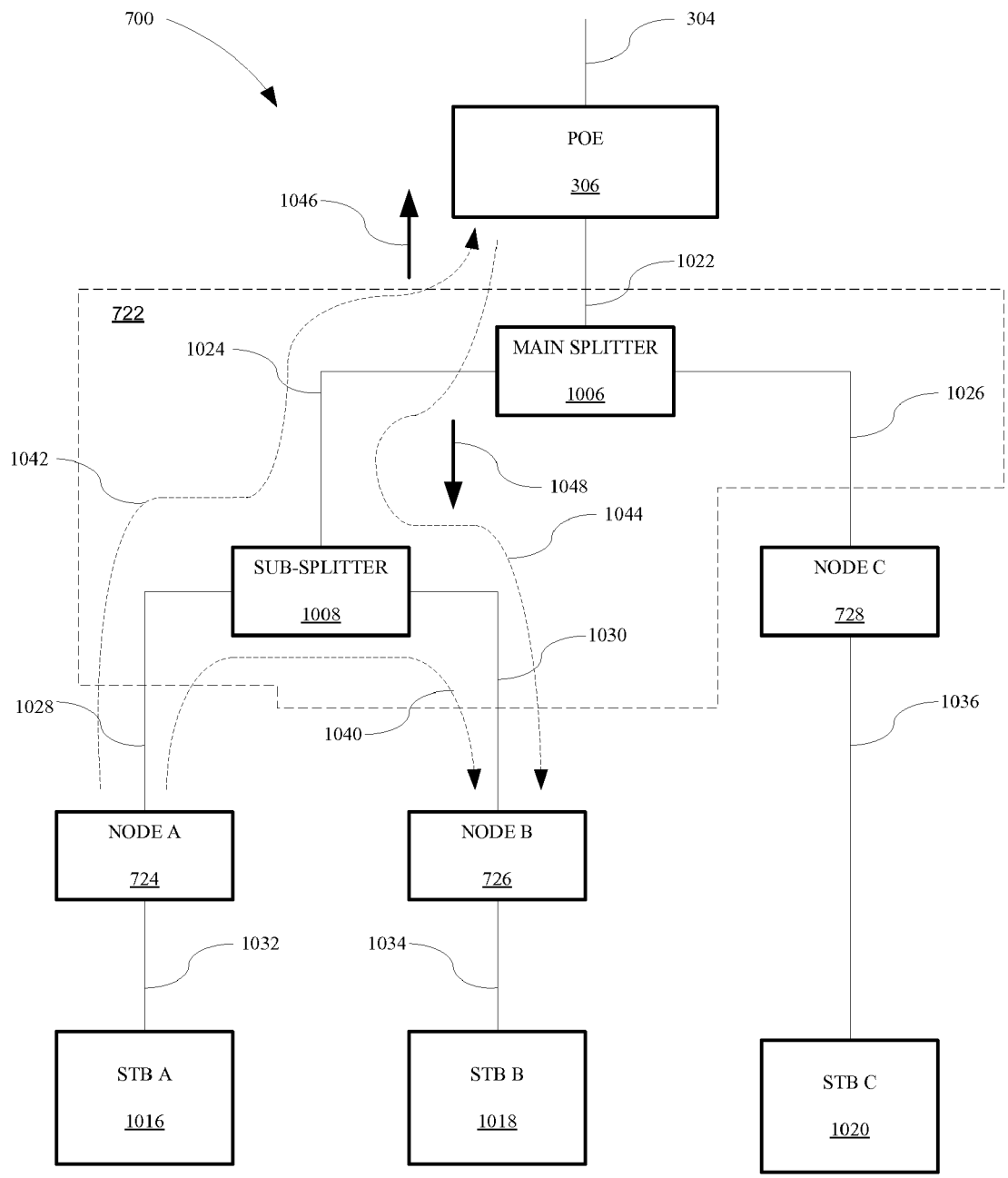
FIG. 10 shows a block diagram of another example implementation and signal flows of a BCN network

The application of bit-loading in a BCN network is demonstrated in FIG. 10. As an example, in FIG. 10, a block diagram of the BCN network 700 of FIG. 7 is shown. The BCN network 700 may be in signal communication with a cable provider (not shown), satellite TV dish (not shown), and/or external antenna (not shown) via a signal path 304, such as a main coaxial cable from the customer premises to a cable connection switch (not shown) outside of the customer premises.

The BCN network 700 may include the POE 306 and splitter network 722 that has a main splitter 1006, a sub-splitter 1008, Nodes A 724, B 726 and C 728, and STBs A 1016, B 1018 and C 1020. Within the BCN network 700, the POE 306 may be in signal communication with the main splitter 1006 via signal path 1022. The POE 306 may be implemented as a coaxial cable connector, transformer and/or filter.

The main splitter 1006 may be in signal communication with sub-splitter 1008 and Node C 728 via signal paths 1024 and 1026, respectively. The sub-splitter 1008 may be in signal communication with Node A 724 and Node B 726 via signal paths 1028 and 1030, respectively. The main splitter 1006 and sub-splitter 1008 may be implemented as coaxial cable splitters. Node A 724 may be in signal communication with STB A 1016 via signal path 1028. Similarly, Node B 726 may be in signal communication with STB B 1018 via signal path 1030.

Moreover, Node C 728 may be in signal communication with STB C 1020 via signal path 1026. STBs A 1016, B 1018 and C 1020 may be implemented by numerous well known STB coaxial units, such as cable television set-top boxes and/or satellite television set-top boxes. Typically, the signal paths 304, 1022, 1024, 1026, 1028, 1030, 1032, 1034, and 1036 may be implemented utilizing coaxial cables.

As an example of operation, if STB A 1016 transmits a message to STB B 1018, the message will propagate through at least two transmission paths from Node A 724 to Node B 726. The first transmission path 1040 travels from Node A 724 through signal path 1028, leakage between output ports in sub-splitter 1008, and signal path 1030 to Node B 726. The second transmission path includes transmission sub-paths 1042 and 1044. The first sub-path 1042 travels from Node A 724 through signal path 1028, sub-splitter 1008, signal path 1024, main splitter 1006, and signal path 1022 to POE 306. The message may reflect due to less than ideal termination at the input or output of the POE 306 and go back through the second sub-path 1044. The second sub-path 1044 travels from POE 306, through signal path 1022, main splitter 1006, signal path 1024, sub-splitter 1008, and signal path 1030.

The first transmission path 1040 typically tends to experience a certain attenuation because of the isolation between the output ports of sub-splitter 1008. The second transmission path 1042 attenuation results mostly from the reflection at the POE 306 due primarily to impedance mismatches between the input or output of POE 306 and the rest of the BCN network 700. Of course, there may be additional paths the signal can travel through due to other reflections in the various paths of the BCN network 700. The result of all these multiple transmission paths is a potentially extensive dispersive channel between STB A 1016 and STB B 1018. This channel, however, is fairly static and does not change rapidly.

Figure 11:
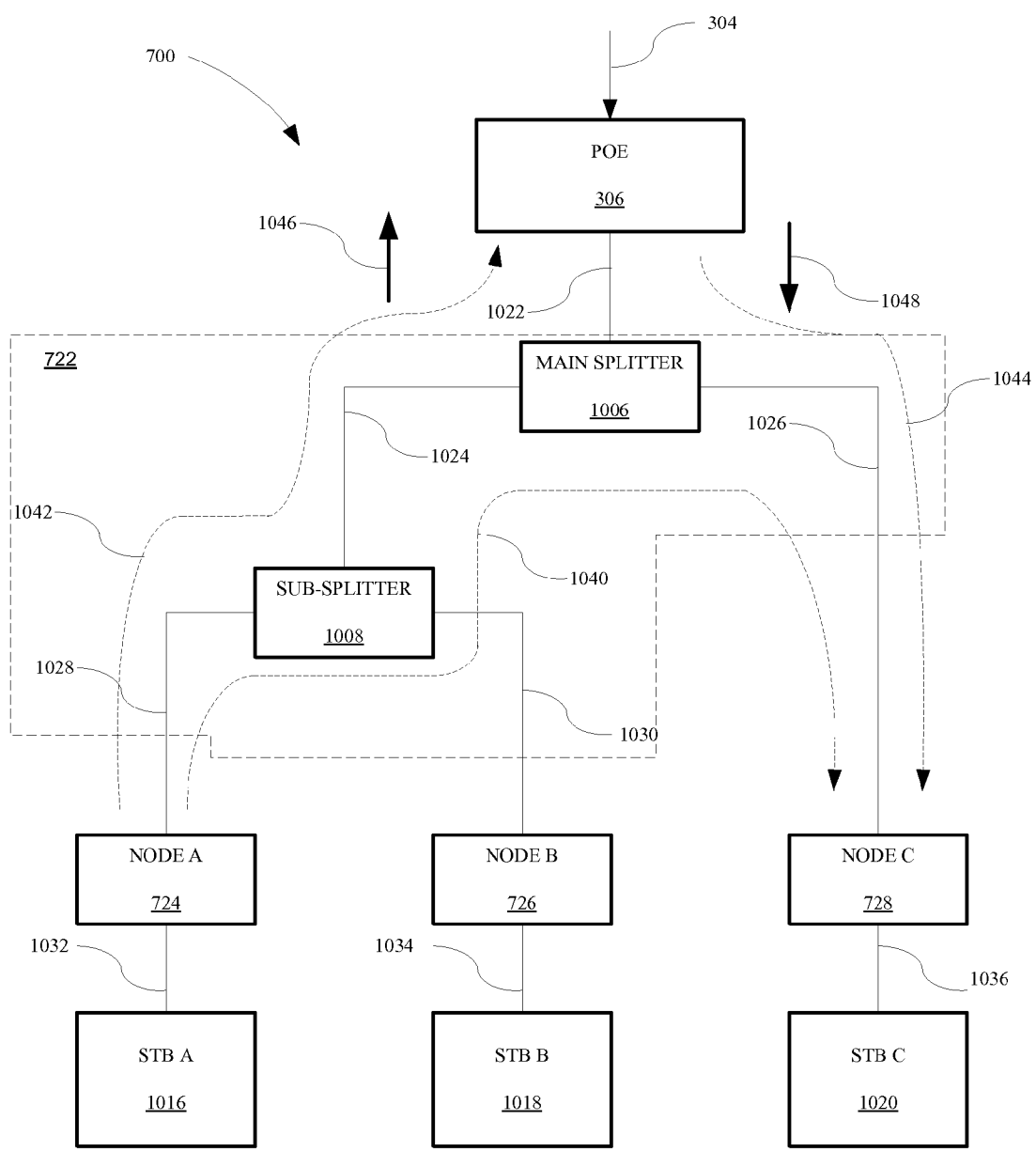
FIG. 11 illustrates another block diagram of another example implementation and signal flows of a BCN network.

As another example, in FIG. 11, the communications between STB A 1016 and STB C 1020 is described for the BCN network of FIG. 10. In this example of operation, if STB A 1016 transmits a message to STB C 1020, the message will propagate through two or more transmission paths from Node A 724 to Node C 728. Two transmission paths of this example are shown in FIG. 11. The first transmission path 1040 travels from Node A 724 through signal path 1028, sub-splitter 1008, signal path 1024, and signal path 1026 to Node C 728, with leakage between the output ports of the main splitter 1006. A second transmission path includes transmission sub-paths 1042 and 1044 and the reflection at the input and/or the output of the POE 306.

In the example of FIG. 11, it is to be expected that the dispersal may be of a different nature than that of FIG. 10 because the leakage through the main splitter 1006 output ports is likely to be different compared to the leakage between the output ports of the sub-splitter 1008, and the difference in path lengths between the two transmission paths in the example of FIG. 11 is likely to be smaller because it includes only the traversing of the path 1022 twice, once on the way to the POE 306 and once on the way back. In contrast, in the example of FIG. 10, the difference in the paths includes the traversing twice of both the 1022 and 1024 paths.

Figure 12:
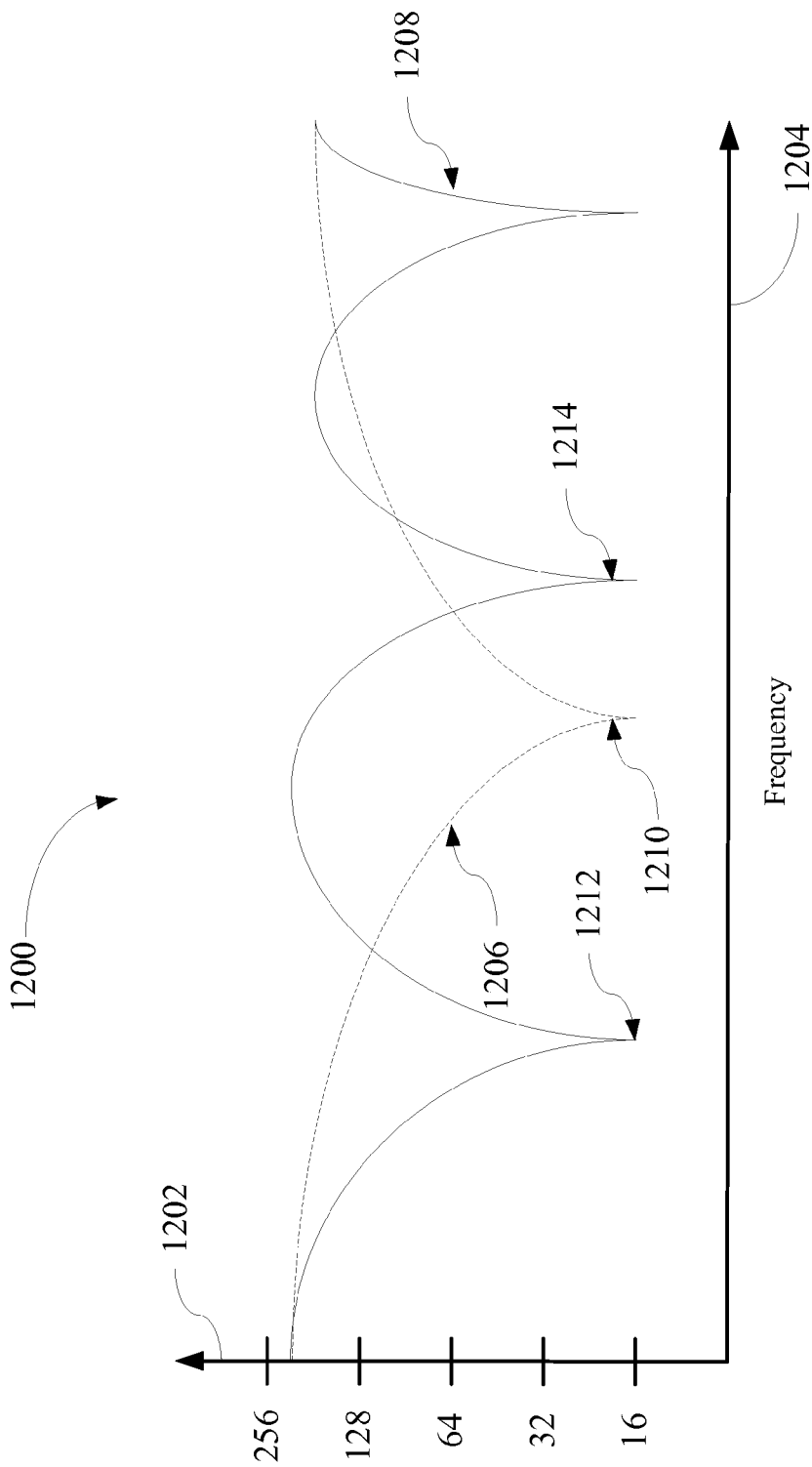
FIG. 12 shows a plot of an example bit-loading constellation versus frequency.

In FIG. 12, a plot 1200 of the frequency response of the Node A to Node B 1208 two transmission path and the Node A to Node C 1206 two transmission path is shown. In both channels, the two transmission paths have similar attenuation, resulting in a frequency response with deep notches. This occurs at frequencies where the phase difference through the two paths is 180 degrees, resulting in the cancellation of the signal because their amplitude is identical. It may be noted that the frequency response of the Node A to Node B 1208 transmission path contains more notches per unit frequency than the Node A to Node C 1306 transmission path because its path time difference is larger. Similarly, because the time difference between the two paths of the Node A to Node C channel is smaller, the frequency difference between the notches in its frequency response is larger, as should be expected. Thus, FIG. 12 illustrates that in order to communicate between Node A and Node B, or between Node A and Node C, a special waveform may be required in order to deal effectively with the respective channels. Moreover, these channel responses are likely to be different in different cable systems and also are likely to change in time due to a change in configuration, such as when a user may add new devices to his cable system or change its topology, or due to slowly occurring changes caused by aging or changes in temperature or humidity that can change the leakage through the devices. Hence, the transmission system needs to constantly adapt to changing channel conditions.

In the example implementation, such adaptation is performed through a technique of OFDM modulation combined with an optimized bit-loading. In an OFDM optimized bit-loading, the modulation for each carrier is adapted to the channel response and noise (and interference) at the carrier frequency. FIG. 12 shows an example of bit-loading constellation 1202 versus frequency 1204 for the channel path utilized by Node A to transmit to Node B 1208 and the channel path utilized by node A to transmit to Node C 1206. Line 1208 represents the AB channel and line 1206 represents the AC channel. As can be seen from FIG. 12, at frequencies where the frequency response provides good transmission path and depending on the noise level, the BCN network may utilize high order modulation to permit better throughput at these frequencies. The modulation axis 1202 shows the QAM level (16, 32, 64 . . . 256) corresponding to a given frequency response level 1206 and 1208 at a given frequency 1204. Around the notch frequencies 1212 and 1214 of the response 1208 and 1210 of the response 1206, nothing at all may be transmitted because the notch is very deep. Sufficient margin may be provided to ensure that the selected modulation provides the necessary Bit Error Rate ("BER") and allows for small changes in the response. Additional QAM levels such as 2-QAM, also known as BPSK, and 4-QAM, also known as QPSK, can be used but are not shown in FIG. 12.

Returning to FIG. 9, the BCN network 900, in order to ensure that both Node B 726 and Node C 728 are able to receive a broadcast signal transmitted from Node A 724, utilizes a bit-loading modulation scheme that is known as the common bit-loaded modulation scheme. The common bit-loaded modulation scheme transmitted via the A-BC channel, along signal path 902, is a combination of the bit-loading modulation scheme transmitted via the AB channel, along signal path 812, and the AC channel, along signal path 822.

Figure 13A:
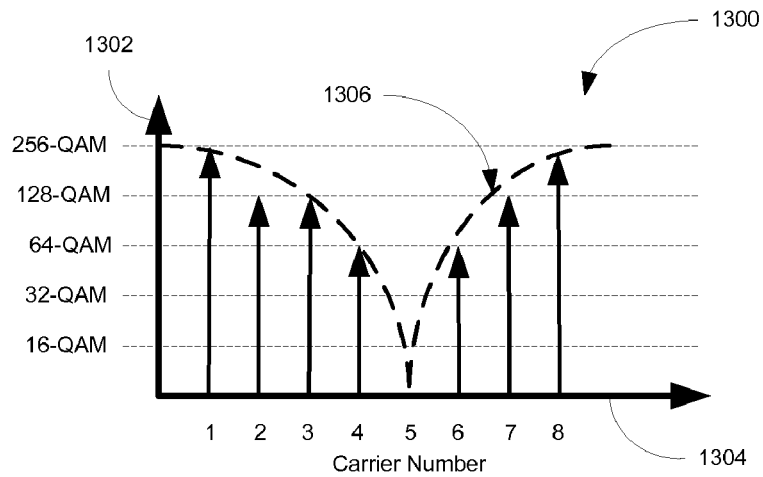
FIG. 13A shows a plot of the bit-loading constellation versus carrier number for the channel path between node A and node B of FIG. 7.
Figure 13B:
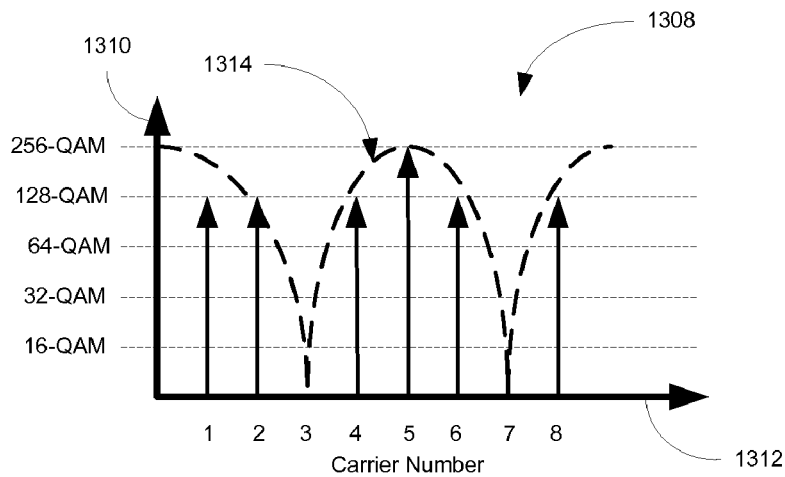
FIG. 13B shows a plot of the bit-loading constellation versus carrier number for the channel path between node A and node C shown in FIG. 7.
Figure 13C:
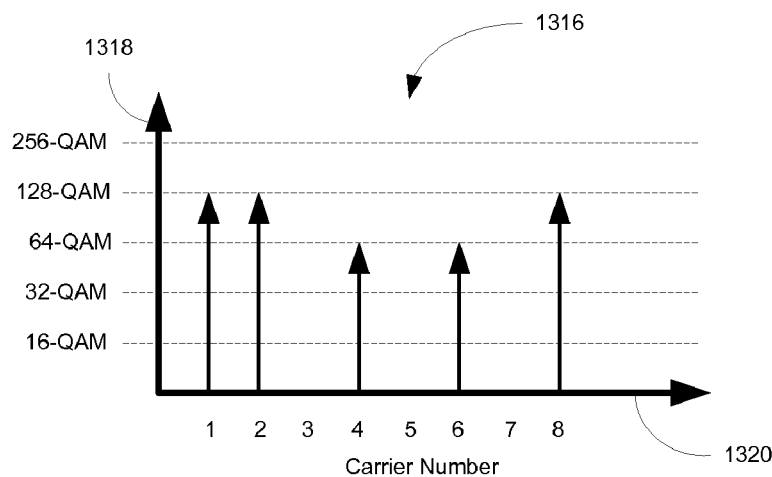
FIG. 13C shows a plot of the bit-loading constellation versus carrier number for the resulting broadcast channel path between node A and node B and node A and node C based on the constellations shown in FIGS. 13A and 13B.

FIGS. 13A, 13B and 13C provide examples of common bit-loading. In FIG. 13A, a plot 1300 of carrier frequency signals of various bit-loading constellations 1302 versus carrier number 1304 for the AB channel path such as that of FIG. 9 between Node A and Node B is shown. Line 1306 represents the AB channel frequency response and a corresponding envelope of the constellation sizes of 8 different carrier signals numbered 1-8 within the transmission signal for the AB channel. In the example, within the AB channel the transmitted OFDM signal includes the individual carriers with different modulation constellations, such as carrier number signals 1 and 8 that may transmit at a constellation size of 256 QAM, carrier number signals 2, 3 and 7 that may transmit at a constellation size of 128 QAM, carrier number signals 4 and 6 that may transmit at a constellation size of 64 QAM, and carrier number signal 5 that may be OFF (i.e., no carrier signal may be transmitted because of the null in the channel response).

Similarly in FIG. 13B, a plot 1308 of a frequency response 1314 and the corresponding bit loading scheme 1310 vs. frequency 1312 for the OFDM carrier frequency signals for the AC channel such as that of FIG. 9 is shown. Again, line 1314 represents the AC channel response and there is a corresponding envelope of the constellation sizes of the 8 different carrier number signals within the AC channel. As an example, within the AC channel, carrier number signals 1, 2, 4, 6 and 8 may transmit at a constellation size of 128 QAM, carrier number signal 5 may transmit at a constellation size of 256 QAM, and carrier number signals 3 and 7 may be OFF (again, no carrier signals may be transmitted because of nulls in the channel response).

In FIG. 13C, a plot 1316 shows the common bit-loading scheme of the OFDM carrier constellations 1318 versus carrier number 1320 for broadcasting messages over the A-BC channel path between Node A and Nodes B and C. In this example, plot 1316 shows that within the A-BC channel, an OFDM signal consisting of carrier number signals 1, 2, and 8 may transmit at a constellation size of 128 QAM, carrier number signals 4 and 6 may transmit at a constellation size of 64 QAM, and carrier number signals 3, 5, and 7 are OFF. These carrier number signal values are the result of comparing the carrier number signals from the AB channel in FIG. 13A and the corresponding carrier number signals from the AC channel in FIG. 13B and choosing the lowest corresponding modulation value for each carrier number. The resulting common carrier frequency signals in FIG. 13C graphically represent signals utilizing the common bit-loaded modulation scheme. These signals would be able to transmit information from Node A to Node B and Node C simultaneously.

Figure 14:
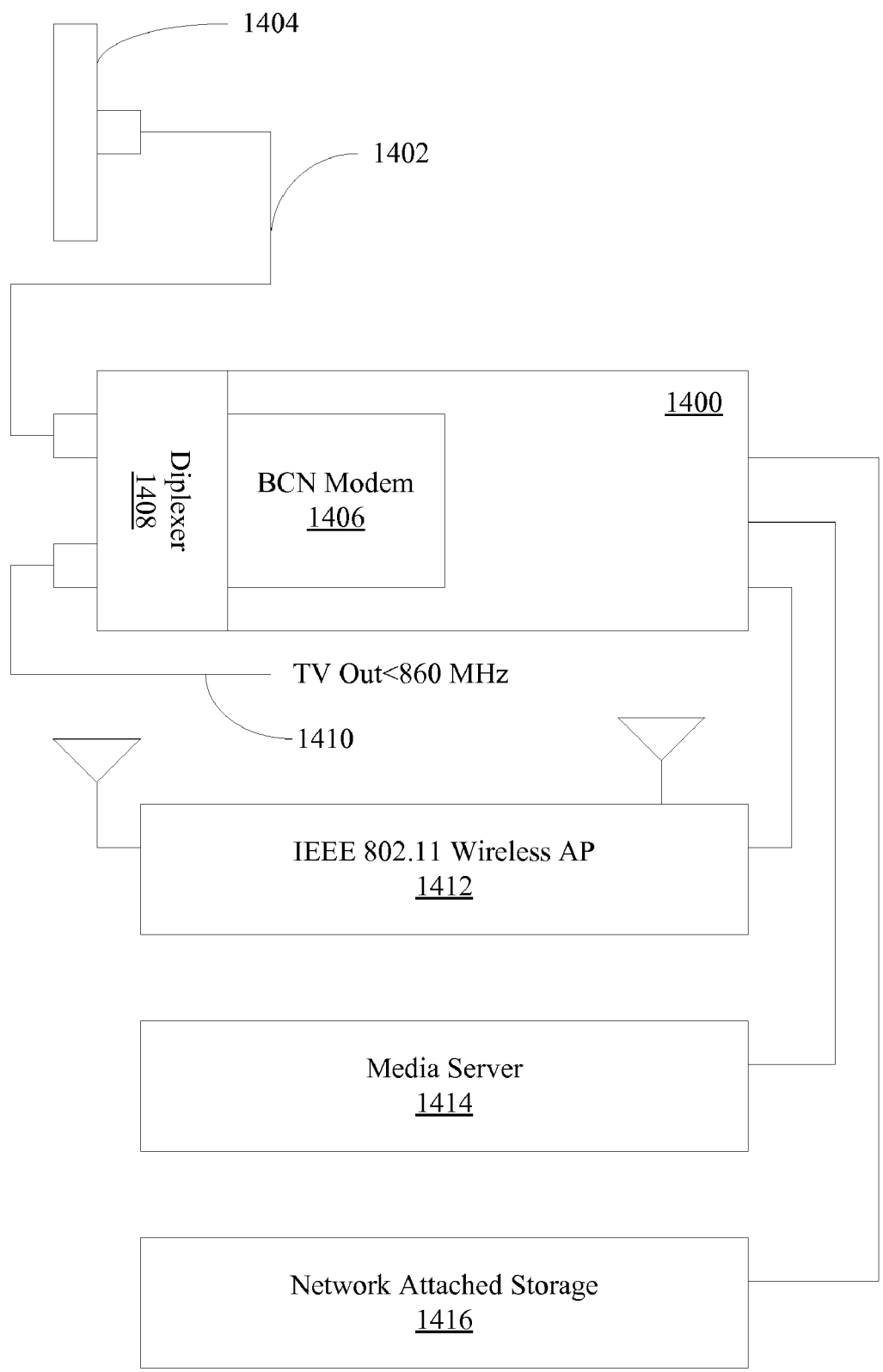
FIG. 14 shows an example block diagram of an Ethernet to Coax bridge node in a BCN network.

Turning to FIG. 14, a block diagram of an Ethernet bridge node of the BCN network 700 for FIG. 7 or FIG. 3 is shown. The BCN network cable 1402 may be connected to a standard coaxial cable wall plate 1404, such as those made by LEVITON. The coaxial wall plate 1404 may secure to the cable 1402 via a connector, such as a F-type or BNC connector. Typically the cable may be 75-ohm RG-59, some type of RG-6, or a combination of such 75-ohm cables. The Ethernet to Coax Bridge Device 1400 may have a diplexer 1408 that passes the RF frequencies below 860 MHz to a cable 1410 that may be connected to a video type device (not shown), such as a television, VCR, Audio/Visual Receiver, or television tuner PC card.

The Ethernet to Coax Bridge Device 1400 may have a BCN modem 1406 that connects to a BCN network such as that shown in FIG. 3 and FIG. 7, and that enables it to code and decode messages between connected devices such as a wireless access point 1412, media server 1414 or a network attached storage 1416 for transport across the BCN network through the cable 1402. The various devices wishing to communicate over the BCN Network to other devices in other bedrooms communicate by using standard Ethernet packets. The Ethernet to Coax Bridge (ECB) provides Ethernet bridging, switching and/or routing functions for all connected devices to other devices connected over the BCN network. Hence, a laptop (not shown) may be connected wirelessly to the Wireless AP 1412. The Wireless AP 1412 may route the Laptop packets to other devices connected to the ECB or through the BCN Network, to other devices in other rooms that are connected to the BCN Network through other ECBs, or directly to STBs, PCs, TVs, gateway and any other device that is capable of communications over the BCN network through a BCN modem. Similarly, the Media Server 1414 may communicate through the ECB to TV sets, other Media Servers or Media Extenders connected to the BCN Network in any room. The ECB may operate a bridge, switch and or router over an Ethernet network. However, its functionality spans not only any Ethernet segment it is connected to but also across the full BCN Network, providing a full Layer 2 and upper layers functionality across the whole BCN network and other networks through gateways. Due to the capabilities of the BCN Network, the ECBs may provide high levels of Quality of Service ("QOS"), including network wide priorities such as IEEE 802.1p, and even higher level of QOS services including prioritized flow control for selected flow across the network. These capabilities are inherent in the BCN Network and may be utilized by all the devices connected to the BCN Network including ECBs.

Figure 15:
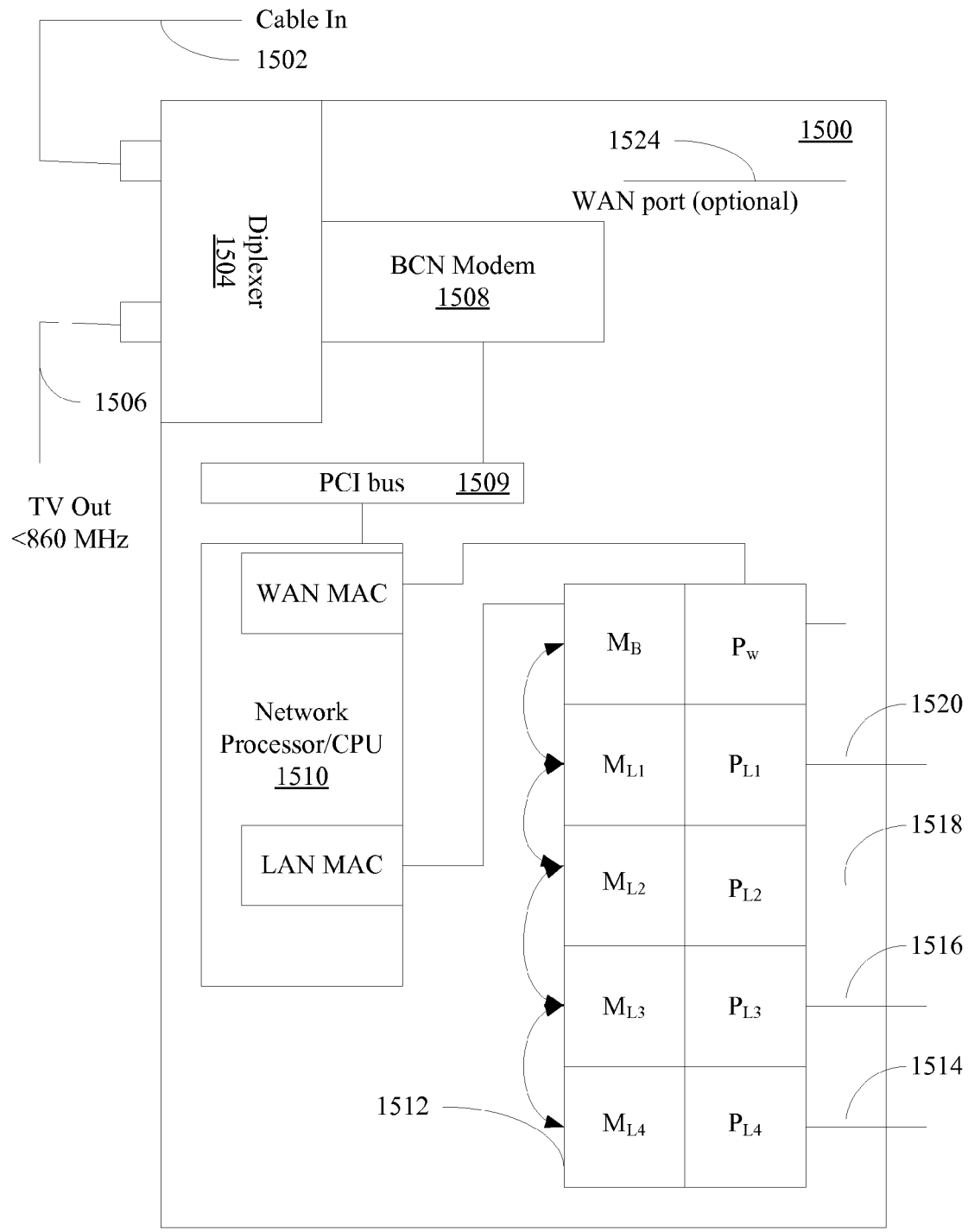
FIG. 15 shows a block diagram of one implementation of a multi-port Ethernet to coax bridge/router.

In FIG. 15, a cable home gateway/router node 1500 is shown. The cable home gateway/router node 1500 is connected to BCN network by a cable 1502. The cable home gateway/router node 1500 may have a diplexer 1504 that passes RF frequencies below 860 MHz to another cable 1506 that may be connected to a video type device or any other cable device that utilizes frequencies below 860 MHz, such as a STB, TV set, cable modem, etc. A BCN modem 1508 may be connected to BCN network cable 1502 via the diplexer 1504. The BCN modem 1508 may also be connected to a network processor/CPU 1510, such as a host microprocessor, digital signal processor, or other known digital controllers by an electrical bus, such as a PCI bus 1509 or any other internal or external parallel or serial high speed bus.

The Network Processor/CPU 1510 may be configured to support WAN connectivity, such as the Docsis cable modem communication standard for data communication with a cable head end or DSL, dial-up connection, or Wireless Access through a WAN port. This port may or may not support MAC functions, but may transmit and receive WAN Packet Data Units to the WAN port 1524. Further, the Network Processor/CPU may support other connections, such as USB 1.0, USB2.0, or other networking technologies. A N-port switch (4-port shown) 1512 may also be incorporated into the cable home gateway node/router 1500. The ports 1514, 1516, 1518, and 1520 (typically called local area network ports) may be coupled to Ethernet network devices (not shown). The cable home gateway/router node 1500 may also provide multiple networking functions, including gateway functions, e.g., WAN to/from LAN packet transmission and protocol conversions, LAN switching and/or routing functions and protocol conversions between the multiple LAN and WAN functions, which may include one or more BCN networks.

Figure 16:
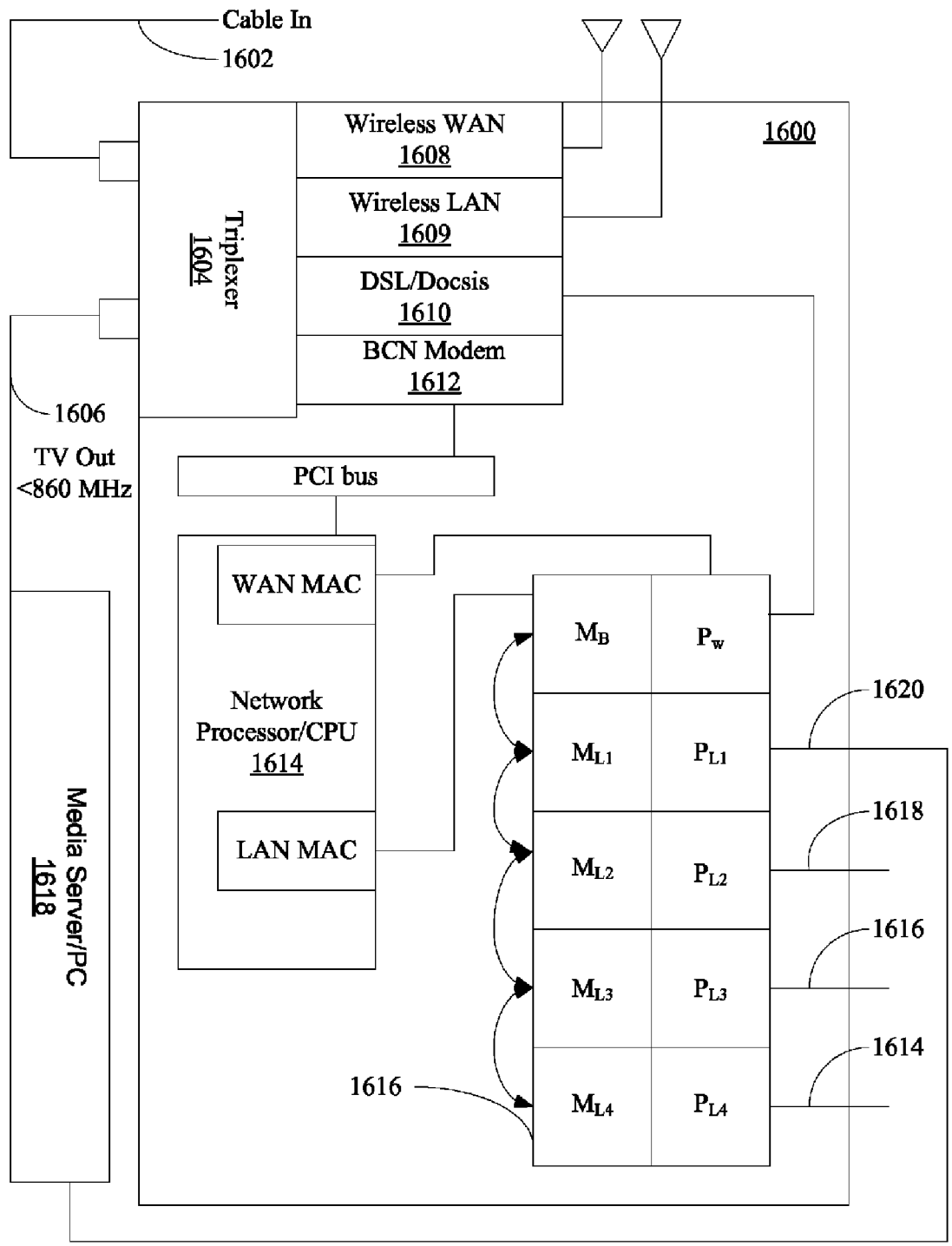
FIG. 16 shows a block diagram of an Ethernet bridge/router with additional WAN and LAN ports including DSL/Cable Modem and wireless.

Turning to FIG. 16, an integrated Ethernet bridge/router with integrated WAN modems ("IEBR") 1600 is shown. In this example implementation, the functionality and options of the bridge/router of FIG. 15 are integrated with the functionality of cable modem and/or DSL and/or wireless access, and also with wireless LAN connectivity as additional local ports. A BCN network cable 1602 is connected to a triplexer 1604 that may pass RF frequencies less than 860 MHz on another cable 1606 to a video device (not shown). The triplexer 1604 may also be coupled to a Docsis cable modem 1610 and a BCN modem 1612. The IEBR 1600 also may have a DSL modem that interfaces to a telephone line (not shown) and also to a wireless WAN access modem 1608. The IEBR 1600 may also be connected to a network processor 1614 and support an N-port switch (4-port switch shown) 1616 and a wireless LAN 1609. Each of the ports of the N-port switch may be connected to an Ethernet enabled device, such as a media server/PC 1622. The media server/PC 1622 may also be connected to the other cable 1606. The functionality of the integrated router/WAN modem is similar to that of FIG. 15 but is integrated with the WAN modems and a wireless LAN.

Figure 17:
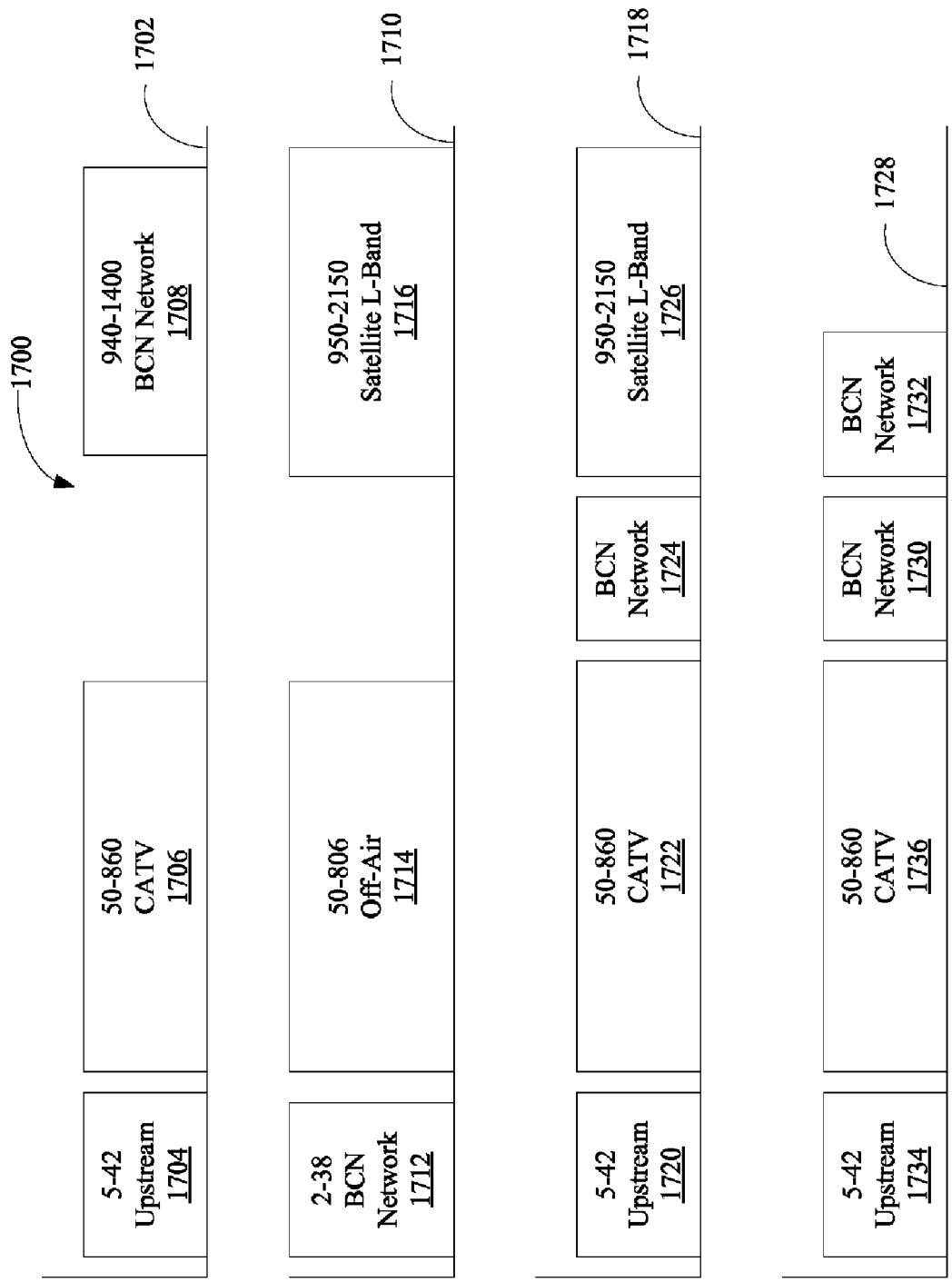
FIG. 17 is an illustration of various frequency plans for use of the BCN network in different home environments that may include satellite, cable, telco or other services.

In FIG. 17, a diagram 1700 of frequency plans is illustrated. In most two-way cable systems 1702, an upstream frequency band is located in the 5-42 MHz frequency band 1704. Analog and digital cable television signals and cable modem downstream carriers are found in the 50-860 MHz frequency band 1706 and the BCN network 1708 is located between 940-1400 MHz. In theory, the BCN network can be located above 860 MHz, but in order to allow diplexers in systems that may require it, it may be prudent to allow a certain frequency band for the filters roll-off. A different implementation, such as the network shown in FIG. 4 or one where the BCN network is not connected to cable at all and is available exclusively for satellite use, is shown in FIG. 17, 1710. In this implementation, the BCN network 1712 may be located between 2-38 MHz and off-air signals 1714 between 50-806 MHz. The Satellite L-Band 1716 may be located between 950-2150 MHz. In yet another implementation 1718, the system operates on a BCN Cable Network that is capable of providing both satellite and cable services. In this case, the cable upstream frequency band 1720 may be present between 5-42 MHz, the cable TV signals between 50-860 MHz 1722, the BCN network 1724 in a frequency band found between 880 and 940 MHz, and satellite L-band 1726 located between 950-2150 MHz. The final implementation 1728 demonstrates the application over cable systems where two or more distinct BCN networks 1730 and 1732 located above the 5-42 upstream frequency band 1734 and cable TV 50-860 frequency band 1736 are utilized. In this frequency plan, although only two BCN Networks, 1730 and 1732, are shown, many more may be placed above the ones shown in this frequency plan. Thus, it is shown that BCN networks may be located above or below traditional services in addition to being multiple BCN networks.

Figure 18:
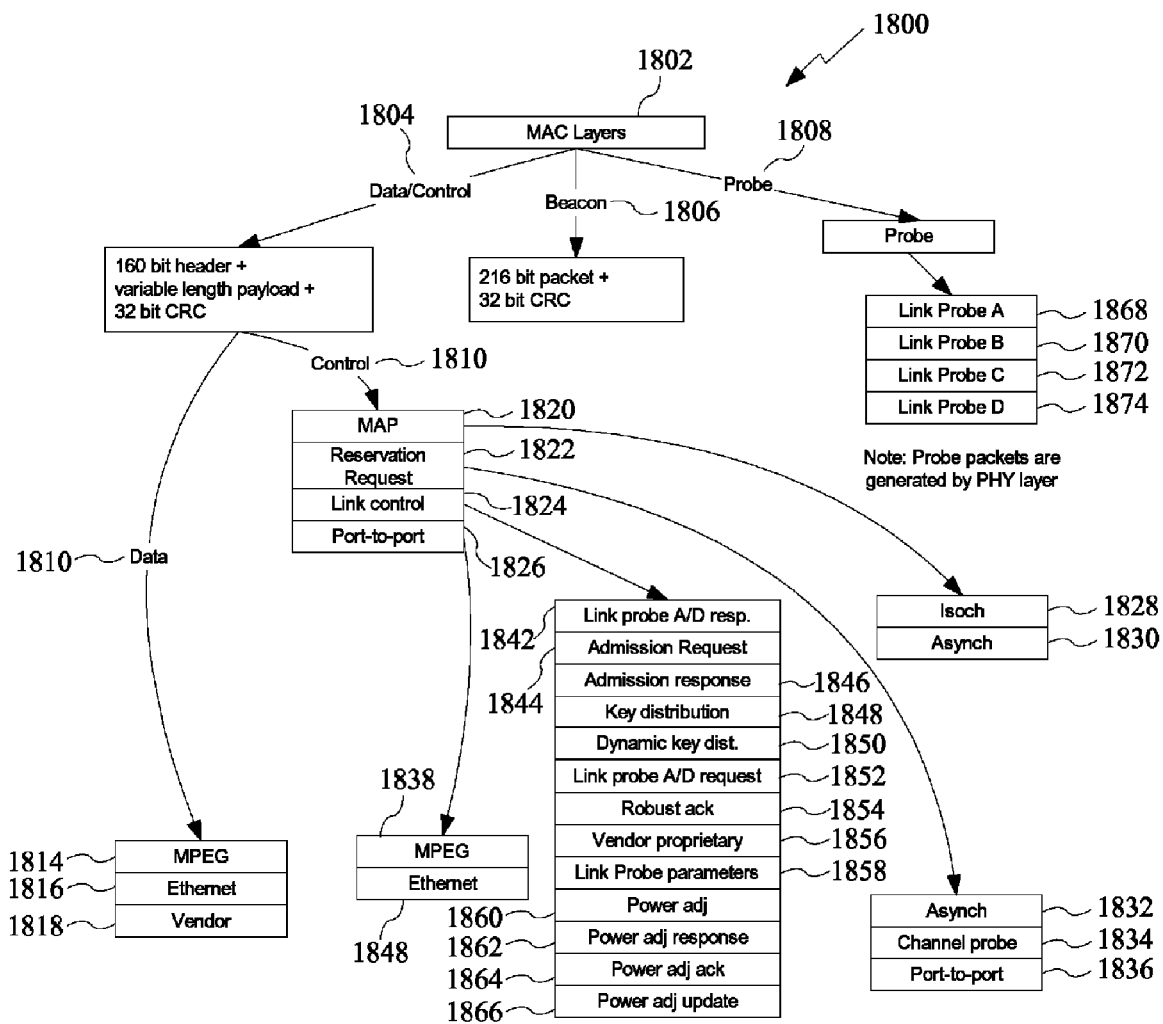
FIG. 18 is an illustration of the multimedia access control (MAC) frame types.

Turning to FIG. 18, multimedia access control (MAC) frame types 1800 are described. A multiple layer protocol model may be employed with a transport layer encapsulating the MAC layer and carried in a physical (PHY) layer. The MAC layers 1802 may be made up of predefined packets or formats. The three top-level types of MAC transmission packets that may occur within the BCN Network 300 are; Data/control packet transmissions 1804 (performed by both the Network Coordinator (NC) node and client nodes), Beacon transmissions packet 1806 (performed by NC node) and Probe transmissions packet 1808 (scheduled by the MAC layer but transmitted by another layer).

The data/control packet 1804 may have a hundred and sixty bit header followed by a variable length payload and then a thirty-two bit cyclic redundancy checking (CRC). The payloads, for example, may be either control payload 1810 or data payload 1812. The data payload 1812 may be MPEG type data 1814 (MPEG, MPEG-2, MPEG-4, etc. . . . ), data protocols 1816, such as Ethernet, or vendor defined data messaging 1818 that supports audio, video, data, or a combination of audio, video and data.

The control payload 1810 may be made up of MAP data 1820, reservation request 1822, link control 1824, and port-to-port control data 1826. Examples of MAP data 1820 that may be included as control payload 1810 include isochrounous MAP data 1828 or asynchronous MAP data 1830. Examples of reservation request control payloads 1810 include messages to reserve bandwidth for asynchronous communication 1832, channel probes 1834, and reserved bandwidth for port-to-port communication 1836. The port-to-port control data

1826 may contain control information for the transmission of MPEG type data 1838 and Ethernet 1840.

The link control 1824 payload may contain link probe A/D response 1842, admission request 1844, admission response 1846, key distribution 1848, dynamic key distribution 1850, link probe A/D request 1852, robust acknowledgement 1854, vendor proprietary link control payload 1856, link probe parameters 1858, power adjustment 1860, power adjustment response 1862, power adjustment acknowledgement 1864, and power adjustment update 1866. In other implementations, other types of link control payload data may be defined and used in control packets 1810.

The beacon packet 1806 may be a packet that is 216 bits in length with an additional 32 bits of CRC data. When a BCN modem is activated, it attempts to locate the network timing by receiving a beacon packet 1806 which identifies network timing and essential network control information including network admission area, and other information identifying the time location and characteristics of other important and valid information such as future beacon locations, future channel assignment information, etc. Any BCN modem that wishes to be admitted to the network then transmits an admission request 1844 in a data/control packet 1804 to the NC using the identified admission area.

A probe packet 1808 may be generated by the physical layer and be used to optimize and to verify each link in the network, such as link probe A 1868, link probe B 1870, link probe C 1872, and link probe D 1874. More specifically, the probe packet 1808 may be used for at least three functions in a BCN network 310: link optimization, hardware calibration, and requesting a time slot to be allocated by a NC that may be used by a BCN modem to send packets to itself. In other implementations, additional probe packet payloads may be defined for the additional link configuration and optimization.

In FIG. 19, a general format of an example header portion 1900 of the MAC control/data packet 1804 of FIG. 18 is shown. The header 1900 may be of a fixed length and consists of a transmit clock time stamp 1902, type 1904 and subtype 1906 of the packet, a version identifier for MAC format 1908, identification of the source BCN modem 1910 and the destination BCN modems 1912, length of the packet 1914, a reserved area 1916 and a header check sequence 1918 such as a CRC. In other implementations, the header portion of the MAC control/data packet may contain additional fields or few fields (i.e., no reserved area 1916). Further, the size of the fields may vary in different implementations.

The payload of a MAC packet 1804 may vary in length from 0 to 16 KB. The specific size is dependent on the packet type 1904 and packet subtype fields in the MAC packet header 1900. In the current implementation, if the payload length is zero, then there is no payload or CRC following the MAC Packet Header 1900. If the payload length is between 4B to 16 KB, the last 4 bytes of the payload will contain the 32-bit CRC. The 32-bit CRC covers the entire payload, but the 32-bit CRC does not cover the MAC Packet Header. Also in the current implementation, payload lengths of 1, 2 and 3 bytes may not be allowed.

In some implementations, multiple payloads may be nested inside a primary payload. This is commonly referred to as Concatenation and may be indicated by a flag in the MAC Packet Header (not shown). Concatenation is useful to gather multiple smaller payloads (e.g., Ethernet packets) into a single transmission, which greatly increases efficiency within the network.

Turning to FIG. 20, a media access plan (MAP) protocol data unit (PDU) that is continued in the payload part of a MAC control packet 1804 of FIG. 18 is shown. The MAP PDU 1820 is one of four possible control PDUs (MAP PDU 1820, Reservation request PDU 1822, link control PDU 1824, and port-to-port message PDU 1826). The MAP PDU 1820 may be used to convey information between BCN modems regarding upcoming transmissions. The reservation request PDU 1822 may be used to obtain transmission bandwidth. The link control PDU 1824 may be used to ensure efficient operation of the BCN network. The port-to-port message PDU 1826 may be used to compliment data flows by exchanging information associated with providing quality of service within the network. The packet type field 1904 of the MAC header 1900 indicates the presence of one of the control PDUs 1810.

Two types of MAP PDUs 1820 are possible in the BCN: isochronous 1828 and asynchronous 1830. Isochronous MAP PDUs 1828 are used to convey information regarding transmission times of isochronous data flow. Asynchronous MAP PDUs 1830 are used to convey information about scheduled transmissions on the medium.

In FIG. 20, an asynchronous MAP PDU 1830 of FIG. 18 with a fixed-length PDU 2000 is shown. The fixed-length PDU 1830 consist of the following fields: asynchronous MAP header 2002, followed by one or more allocation units (AUs) 2004, 2006, 2008, belonging to one of the following types—Asynchronous MAP AUs, Probe AUs, and NACK AUs. Each of the AUs may have null bytes that may be used to pad the MAP PDU 2000 to a fixed length. In other implementations, the asynchronous MAP PDU 1830 may be of variable length, but additional processing would be required for formatting and decoding the PDU. Further, the probe AUs are used to allocate transmission opportunities to probe transmissions and the asynchronous MAP AUs 2004; 2006, 2008 may be used to allocate transmission bandwidth to MAC control/data packet 1804 transmissions.

Turning to FIG. 21, an asynchronous MAP PDU header 2100 of the asynchronous MAP PDU of FIG. 18 is illustrated. The asynchronous MAP PDU header 2100 may be a fixed-length header with a length of 224 bits. The MAP PDU header 2100 may include a system time from which the MAP is valid 2102, system time to which the MAP is valid 2104, parameters such as encryption flags 2106, state information 2108, bit masks 2110, Node identification for probe messages 2112, and miscellaneous data 2114.

In FIGS. 22A&B, the format 2200 of an asynchronous MAP allocation unit 1830 is illustrated. Each allocation unit 1830 provides information about the start time and type of transmission scheduled along with the modulation scheme to be used and the source and destination BCN modems for the transmission. The format 2200 may include a type field 2202, subtype field 2204, source node identification 2206, destination node identification 2208, modulation identification 2210, type of probe transmission 2212, identification of source node 2214, destination node identification 2216, training bits 2218, miscellaneous bits 2220, and probe data and offsets 2222.

Turning to FIG. 23, an illustration of the format of a NACK allocation unit 2300 is shown. These NACK allocation entries are used to provide information to requesting BCN modems and include reasons why the NC BCN modem did not allocate bandwidth to their pending requests. The use of the NACK allocation units 2300 may be optional in some implementations. The NACK allocation unit 2300 may include reason code 2302, identification of original requesting BCN modem 2304, sequence number 2306, type of original request being NACKed 2308, and subtype 2310.

Turning to FIG. 24, an illustration of a reservation request PDU 1822 is shown. BCN modem devices in a BCN network to request transmission times use the reservation request PDU 1822. An example of a reservation request PDU may include a reservation header 2402 and request elements 2404, 2406, 2408. The request element portion of the request PDU 1822 may be of variable length. In other implementations, the request element portion may have a predetermined fixed length which is maintained with padding bits. The following types of reservation request PDUs 1822 may be used in a BCN network to make a reservation for isochronous data, asynchronous data, link probe, link control, and port-to-port messages.

In FIG. 25, an illustration of the format 2500 of the request PDU 1822 of FIG. 24 is shown. The format 2500 may include an identifier 2502 of the number of request elements in the payload, miscellaneous data 2504, reserved bits 2506, state data 2508, and type of request elements 2510. In other implementations, fewer or additional fields may be used in a request PDU.

In FIG. 26, an asynchronous data reservation request element 2600 used in the format 2500 of FIG. 25 is illustrated. The asynchronous reservation requests may be sent by a requesting BCN modem to the NC BCN modem to reserve bandwidth for transmission of asynchronous data. The asynchronous data reservation request element 2600 may include a type field 2602, destination field 2604, profile field 2606, sequence number associated with the request 2608, other parameters 2610, and a bandwidth request field 2612.

Figure 27:
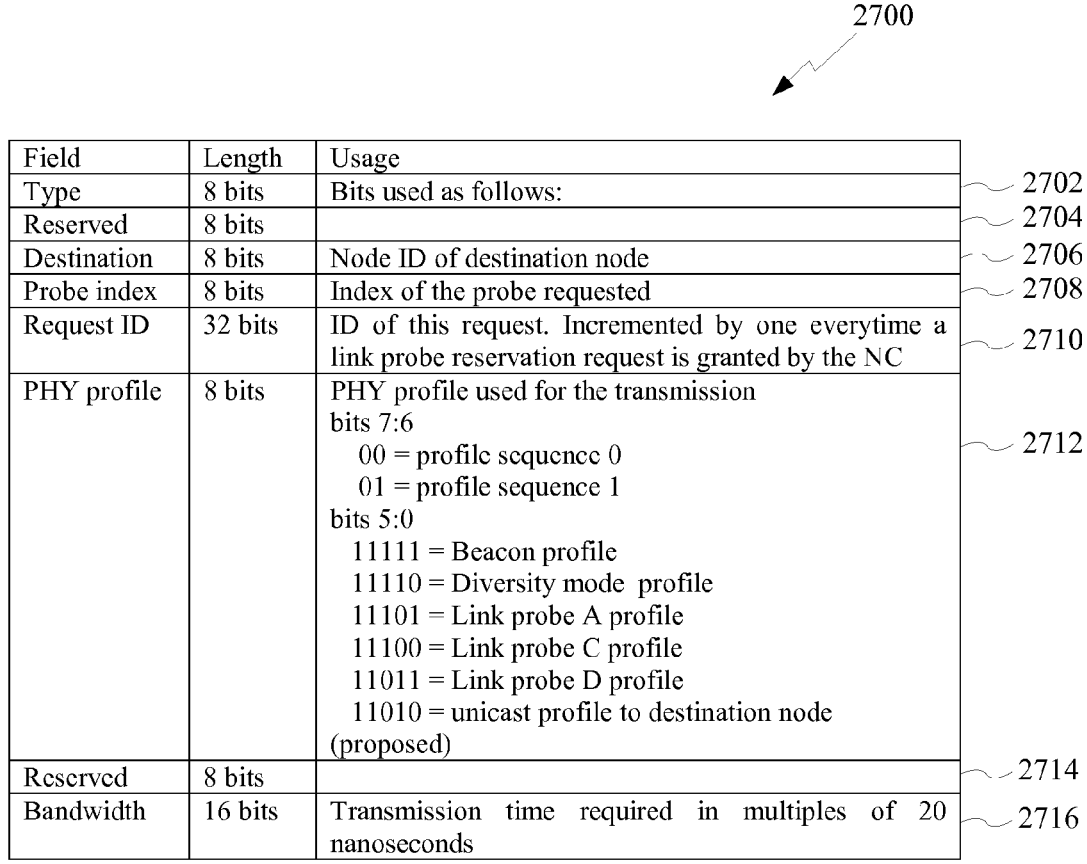
FIG. 27 is a link probe reservation request element used in the format of FIG. 25.

Turning to FIG. 27, a link probe reservation request element 2700 used in the format 2500 of FIG. 25 is illustrated. The link probe reservation requests are sent by a requesting BCN modem the NC BCN modem in order to reserve bandwidth for a probe transmission. The link probe reservation request element 2700 may include a type field 2702, reserved bits 2704, destination field 2706, index of the probe request 2708, identification of the request 2710, profile field 2712, additional reserved bit field 2714, and transmission time required 2716. The identification of the request 2710 may be incremented every time a link probe reservation request is granted by the NC BCN modem. Further, the transmission time required 2716 may be a representation of predefined units, such as 20 nanoseconds in the current implementation.

Figure 28:
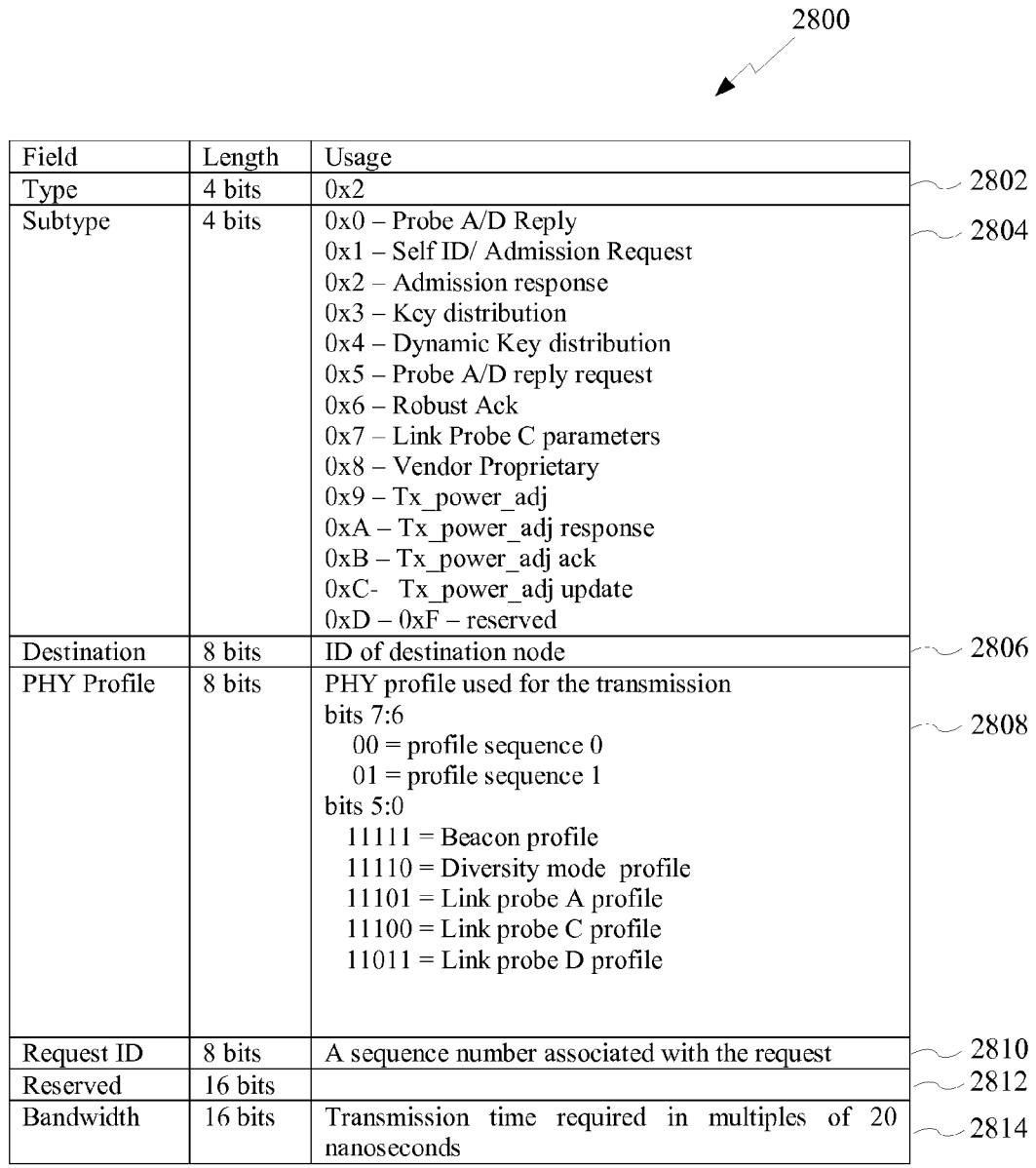
FIG. 28 is a link control reservation request element used in the format of FIG. 25.

In FIG. 28, a link control reservation request element 2800 used in the format 2500 of FIG. 25 is shown. The link control reservation requests are used to reserve bandwidth for transmitting link control packets 1824. The link control reservation request element 2800 may have a type field 2802, subtype field 2804, destination BCN modem identification 2806, profile for transmission 2808, sequence number associated with the request 2810, reserved bits 2812, and required transmission time 2814. The required transmission time 2814 may be a representation of predetermined units, such as 20 nanoseconds used in the current implementation.

Figure 29:
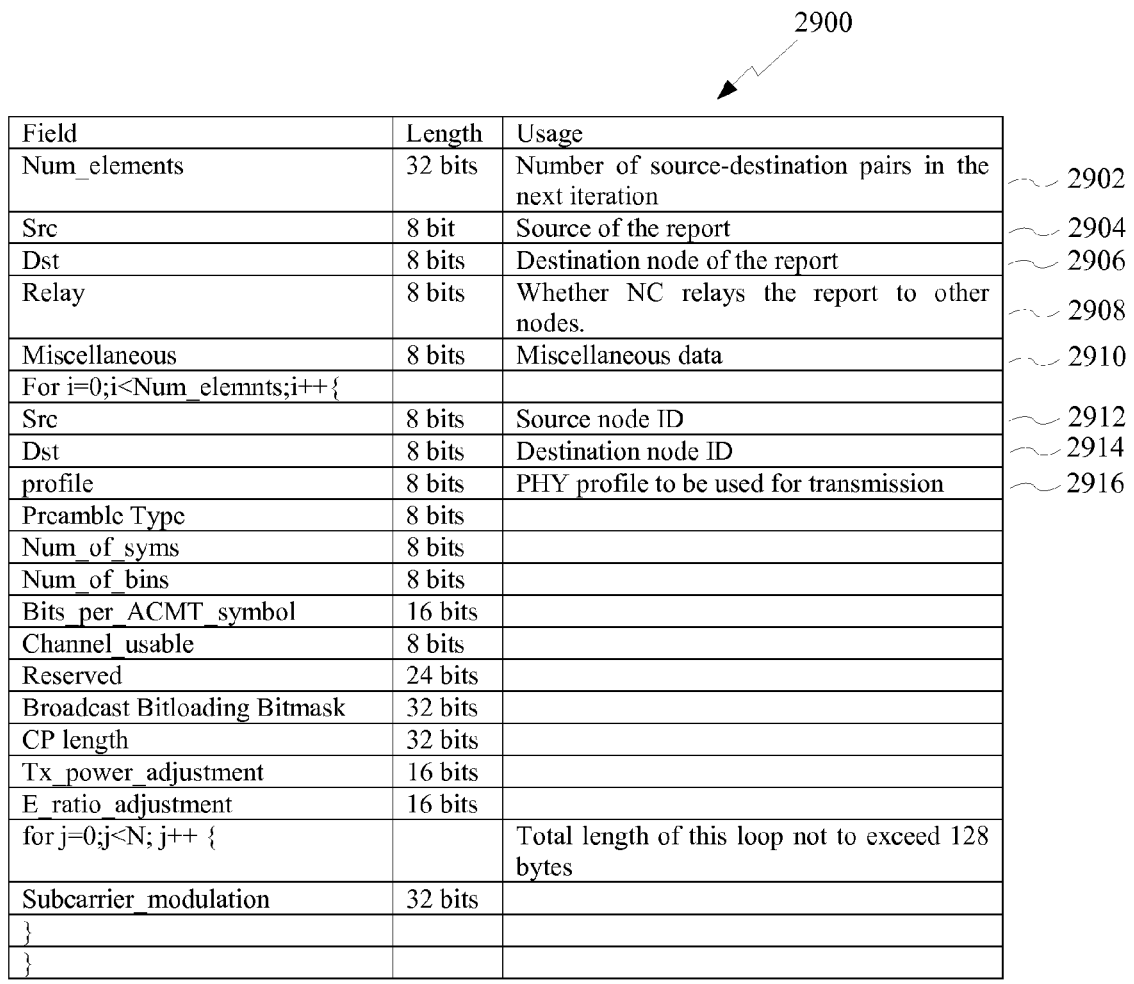
FIG. 29 is an illustration of a link probe report PDU of FIG. 18.

In FIG. 29, an illustration of the format 2900 of the link probe report PDU of FIG. 18 is shown. Link control PDUs are used to maintain connectivity among all BCN modems in a BCN modem network to ensure an acceptable quality of service (QOS) operation of the BCN network. A link probe report may be sent in a MAC packet of Packet type link-control 1824 and Packet_subtype Link probe A/D report. This descriptor includes information regarding source and destination nodes, various settings used for unicast transmission on the channel, transmit power control parameters and reports usable constellation for each subcarrier of the signal transmission. The fields of the format 2900 may include an identifier of the number of source-destination pairs in the next iteration 2902, source identifier 2904, destination BCN modem identifier 2906, BCN NC relay data 2908, miscellaneous data 2910, Source BCN modem 2912, destination BCN modem 2914, profile data 2916, along with other data.

Turning to FIG. 30, an illustration of an admission request PDU 1844 of FIG. 18 is shown. A new BCN modem wishing to join the BCN network sends an admission request PDU 1844 to the NC BCN modem. This request may be sent using diversity mode transmission. The admission request may contain data fields for node protocol support 3002, reserved bits 3004, MAC address of the BCN modem 3006, and transmit power adjustment 3008. The transmit power adjustment 3008 may be a decimal number between zero and 63 which indicates the power adjustment value in units of dB to be used by the NC BCN modem for subsequent transmissions the BCN modem.

In FIG. 31, an illustration of an admission response PDU 1846 of FIG. 18 is shown. The admission response PDU 1846 is sent by the NC BCN modem to a BCN modem that is being admitted to the BCN network. The fields of the admission response PDU may include data fields for the total number of BCN modems or nodes in the network 3102, a reset flag 3104, reserved bits 3106, maximum value of transmit power 3108, iteration data 3112, additional reserved bits 3114, protocols supported 3116, changes to following reserved field 3118, and device identification of the BCN modem 3120. In FIG. 32, an illustration of the format of a key distribution PDU 1848 is shown.

Figure 33:
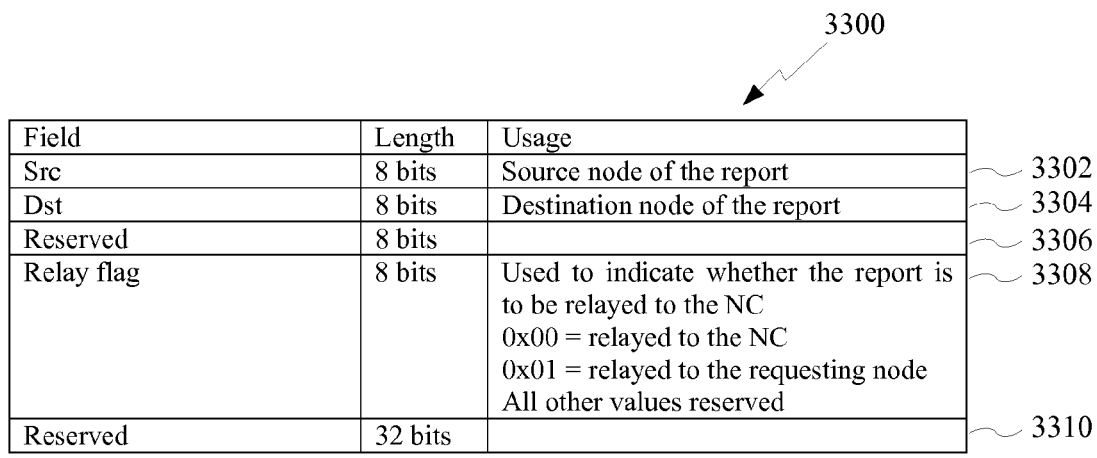
FIG. 33 is an illustration of the format of the link probe report request PDU of FIG. 18.

Turning to FIG. 33, an illustration of the format of the link probe report request PDU 1852 of FIG. 18 is shown. This link control payload 1824 is used by BCN modems to request from other BCN modems a response to the previous A or D type of link probe transmission. The format of the link probe report request PDU 1852 may include fields for source of the report 3302, destination of the report 3304, reserved bits 3306, relay flag 3308, and additional reserved bits 3310.

Figure 34:
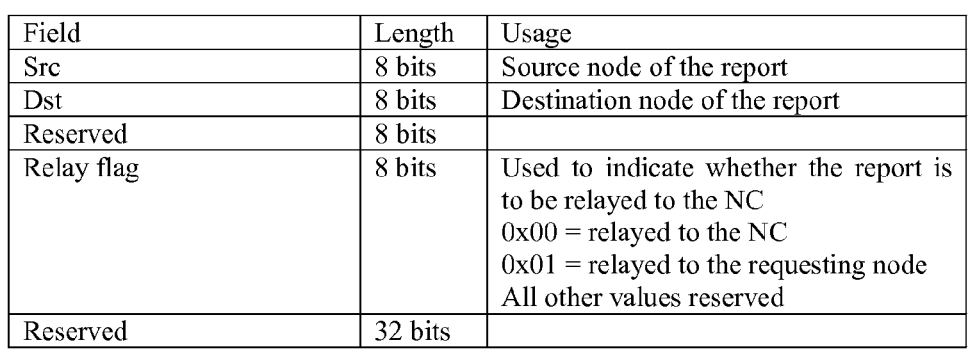
FIG. 34 is an illustration of the format of a general link acknowledgement PDU.

In FIG. 34, an illustration of the format of a general link acknowledgement PDU 3400 is shown. The general link acknowledgement PUD 3400 is a general-purpose acknowledgement payload used at the link layer to acknowledge various requests and operations.

Figure 35:
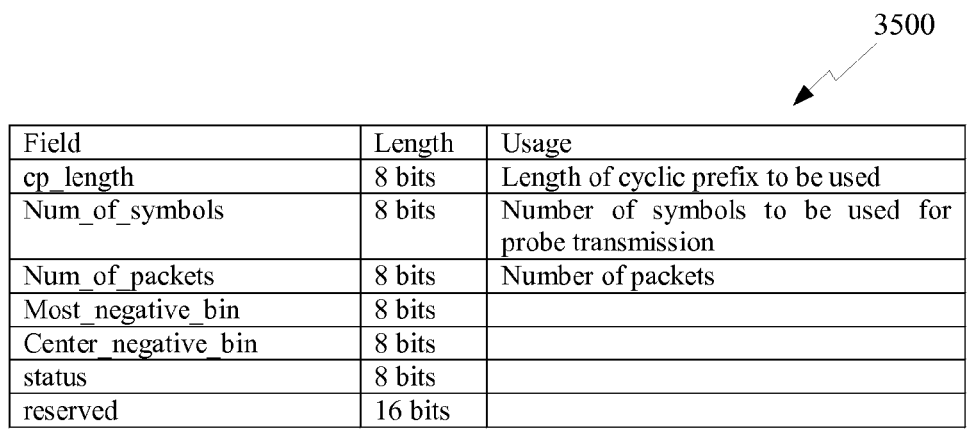
FIG. 35 is an illustration of the link probe C parameters PDU.

In FIG. 35, an illustration of the link probe C parameters PUD 3500 is shown. The link probe C parameters PDU is sent by a node wishing to receive a C type of probe. This packet is sent to the transmitter of the probe to specify the details of the probe signal to be transmitted. Further example PDUs are power adjustment control PDU FIG. 36, power adjustment response PDU FIG. 37, power adjustment acknowledgement PDU FIG. 38, and power adjustment update PDU FIG. 39.

In FIG. 40, an illustration of an Ethernet data payload 1840 of FIG. 18 is shown. Ethernet data payloads are inserted into the MAC payload field according to an IEEE 802.3 frame without its FCS. The length of the Ethernet data payload field is the length of the MAC packet as indicated in the packet header minus the packet CRC and optional timestamps, if present. Other protocols may be transferred in a similar manner as Ethernet data, for example, MPEG data, frame-relay data . . . .

Turning to FIG. 41, a beacon packet 1806 of FIG. 18 is shown. The Beacon packet may be a fixed length packet with a format that includes information elements 4102, reserved bits 4104, network information 4106, reserved bits 4108, BCN modem ID of the NC 4110, next beacon index 4112, reserved bits 4114, admission frame length 4116, asynchronous MAP length 4118, isochronous MAP length 4120, admission window 4122, admission contention index 4124, asynchronous MAP profile 4126, asynchronous MAP index 4128, isochronous profile 4130, isochronous index 4132, and CRC 4134.

Security of data transmitted in the BCN network is provided to assure privacy of transmitted data. The signals in the BCN network are transmitted on the home coax network and may be detectible in homes that share the same multi-tap or are connected to an adjacent multi-tap. Without the use of a blocking filter such as, a "goober," it is possible that neighbors could attempt to maliciously eavesdrop on another's BCN network traffic. In order to prevent this type of eavesdropping, the BCN network provides a privacy feature, which inhibits eavesdropping.

Privacy procedures encrypt all packets transmitted on a BCN network (i.e., the Home Video Network (HVN)) with a 56-bit DES encryption. A user enters a password, which is used to distinguish between different HVNs. The password is basically used to derive keys and authenticate BCN modems. Once a BCN modem is authenticated, it is admitted with no further requirements. BCN modems with the same password will form one HVN and nodes with different passwords will form separate HVNs.

In the BCN network, privacy procedures also help distinguish nodes which should locate themselves on different RF channels. Nodes with different passwords will not locate themselves on the same RF channel because they will not be able to decrypt each other's messages. Instead they will see each other's transmissions as interference on the cable and thus automatically locate themselves on different channels.

Privacy procedures may use both static and dynamic keys for encryption. The static keys are used for authentication and initial key distribution while the dynamic keys are used for subsequent key distribution and traffic. Generation and distribution of dynamic keys are controlled by a BCN modem designated as the Privacy Master, which may also be the NC BCN modem.

The password may be used to derive two static keys, which are used for encrypting MAC Management Messages and initially distributing dynamic keys. These static keys are called the MAC Management Key (MMK) and Initial Privacy Management Key (PMKInitial). BCN modems that have the correct MMK and PMKInitial will be able to communicate with the Privacy Master, receive dynamic keys, and join the HVN.

The two dynamic keys may be used for encrypting the Privacy Management messages and BCN modem traffic. These keys are the Privacy Management Key (PMK) and Traffic Encryption Key (TEK) respectively. PMKs and TEKs are generated and distributed to all other nodes by the Privacy Master. PMKs and TEKs are changed periodically.

There are five levels of attack that BCN modem privacy must consider: Simple Manipulation, Casual Hacking, Sophisticated Hacking, University Challenge, and Criminal Enterprise. The same attack levels may be generalized to the BCN network, which provides protection against Simple Manipulation, Casual Hacking, and Casual Hacking with help from Sophisticated Hacking, by link security in the BCN network for transmitted data.

All encrypted BCN modem messages may be encrypted using DES Cipher Block Chaining (CBC) mode. In other implementations, 128-bit strong encryption may be employed. Encryption blocks must be aligned so that the beginning of the first 64-bit DES block is aligned to the first byte of the BCN modem packet. Chaining is reinitialized on each BCN modem packet. Fragments of less than 64 bits at the end of a packet are encrypted using residual termination block processing. Note that all BCN modem packets must contain an integer number of bytes and because of the 144 bit BCN modem header will contain at least two DES encryption blocks. Given a final block having n bits, where n is less than 64, the next-to-last ciphertext block is DES-encrypted a second time, using the ECB mode, and the least-significant n bits of the result are exclusive OR-ed with the final n bits of the payload to generate the short final cipher block.

An alternative description of this procedure is that given a final block having n bits, where n is less than 64, the n bits are padded up to a block of 64 bits by appending 64-n bits of arbitrary value to the right of the n payload bits. The resulting block is DES-encrypted using the CFB64 mode, with the next-to-last ciphertext block serving as an initialization vector for the CFB64 operation. The leftmost n bits of the resulting ciphertext are used as the short cipher block.

The alternative description produces the same ciphertext. In the alternative description, however, no mention is made of combining ECB encryption with exclusive-OR-ing. These operations are internal to CFB64, just as they are internal to CBC. The alternative description is convenient here because it allows residual block processing to be illustrated using CFB64 examples in [FIPS-81]. CBC mode provides more protection against attacks but can introduce error propagation. However, since a BCN modem provides a high availability network, the impact of error propagation would be small.

A 64 bit Initialization Vector (IV) used with all encrypted packets is fixed and must be; IV=0×AA-AA-AA-AA-AA-AA-AA-AA. The IV may not be transmitted and is known a priori by both the encryption and decryption BCN modem or other network devices. This is not a security risk because all BCN modem messages include a 32 bit transmit time at the beginning of the message which changes with every message. This creates the same effect as a dynamic IV.

A user-entered password may be used to control access of BCN modems to a HVN. BCN modems that have the same password will form one HVN while BCN modems with different passwords will form separate HVNs. Passwords may be manually entered by the user and typically will be the same for all devices, which the user wants to be part of the same HVN. Therefore, it is expected that the user will go around his home and enter the same password into every BCN device in the current implementation. In other implementations, different HVN membership schemes may be employed (such as IP address, MAC address, Portions of address, etc. . . . ).

Although the layout of a graphical user interface (GUI) and other details of how passwords are input to a BCN modem are not shown, each implementation preferably will be capable of accepting a number up to 17 digits long as the password for the BCN network. The GUI should encourage users to enter 17 digit random passwords for maximum protection. If a password that long cannot be entered, it should be pre-pended by numerical zero ("0") to make it into a 17 character ASCII string that is then used to produce a password seed in the current implementation. In order for devices to interoperate, passwords entered on GUI using different methods should result in the same value of for the password seed. In other implementations, other approaches to password seed generation may be used.

Figure 42:
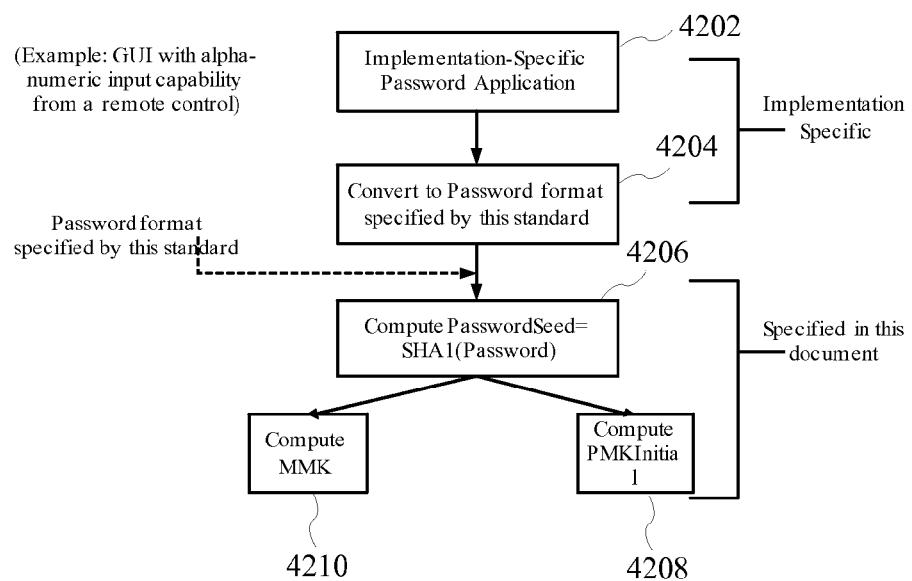
FIG. 42 is a flow diagram of password generation in a BCN network.

In FIG. 42, a flow diagram of password generation in a BCN network is shown. The implementation specific password application, such as GUI with alphanumeric input capability, accepts the password from a user 4202. The format of the password is converted to a predetermined standard 4204. The formatted password is then used to compute the password seed 4206. The password seed then results in a PMK value 4208 and a MMK value 4210. Upon calculating the password seed, the password must be destroyed from local memory so that reading host memory cannot discover it. The password seed should persist through power cycles to ensure that multiple BCN modems may come up and restore communication with each other through power failures.

The process and messaging shown may be performed by hardware or software. If the process is performed by software, the software may reside in software memory or memories (not shown) in the BCN network. The software in software memory may include an ordered listing of executable instructions for implementing logical functions (i.e., "logic" that may be implemented either in digital form such as digital circuitry or source code or in analog form such as analog circuitry or an analog source such as an analog electrical, sound or video signal), may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples, that is "a non-exhaustive list" of the computer-readable media, would include the following: an electrical connection (electronic) having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

While various embodiments of the invention have been described, it will be apparent to those of ordinary skill in the art that many more embodiments and implementations are possible that are within the scope of this invention.

What is claimed is:

1. A Broadband Cable Network (BCN) modem having a transmitter that transmits packets to a plurality of nodes in a broadband cable network, the transmitter comprising:
   a MAC subsystem that provides the packets for transmission within the broadband cable network;
   a Modem subsystem in signal communication with the MAC subsystem, the Modem subsystem receiving the packets from the MAC subsystem and appending information to the packets; and
   a RF subsystem in signal communication with the Modem subsystem, that receives the packets from the Modem subsystem and upconverting the packets received from the Modem subsystem;
   wherein at least one of the packets is a beacon packet that has a channel number field, change field, sequence number field, network coordinator ID field, next beacon index field, admission frame length field, admission window, asynchronous MAP length field and a beacon Cyclic Redundancy Checking (CRC) field; and
   wherein at least one of the packets is a data and control packet having a header and a variable length payload and wherein the header has at least five fields selected from the group consisting of a transmit clock field, packet type field, packet subtype field, version field, source node ID field, destination node ID field, and header check sequence field.

2. A Broadband Cable Network (BCN) modem having a receiver that receives packets from a plurality of nodes in a broadband cable network, the receiver comprising:
   a RF subsystem that receives packets and downconverting the packets wherein at least one of the packets is a control and data packet having a header, the header having at least five fields selected from a group consisting of a transmit clock field, packet type field, packet subtype field, version field, source node ID field, destination node ID field, and header check sequence field, the control and data packet further having a variable length payload;
   a Modem subsystem in signal communication with the RF subsystem, the Modem subsystem receiving the packets and removing control information from the packets; and
   a MAC subsystem that receives packets within the broadband cable network and retrieving data for use by the BCN modem;
   wherein at least one of the packets is a beacon packet that has a channel number field, change field, sequence number field, network coordinator ID field, next beacon index field, admission frame length field, admission window, asynchronous MAP length field and a beacon Cyclic Redundancy Checking (CRC) field.

3. A method for transmitting packets from a Broadband Cable Network (BCN) modem to a plurality of nodes in a broadband cable network, the method comprising:
   formatting the packets in a MAC subsystem that transmits the packets within the broadband cable network, including formatting a data and control packet for transmission within the broadband cable network, the data and control packet having a header and a variable length payload, the header having at least five fields selected from the group consisting of a transmit clock field, packet type field, packet subtype field, version field, source node ID field, destination node ID field, and header check sequence field;
   receiving the packets from the MAC subsystem at a Modem subsystem that is in signal communication with the MAC subsystem and that appends information to the packets; and
   upconverting the packets with the information for transmission via the broadband cable network at a RF subsystem that is in signal communication with the Modem subsystem;
   wherein at least one of the packets is a beacon packet that has a channel number field, change field, sequence number field, network coordinator ID field, next beacon index field, admission frame length field, admission window, asynchronous MAP length field and a beacon Cyclic Redundancy Checking (CRC) field.

4. A method for receiving packets at a receiver in a Broadband Cable Network (BCN) modem from at least one node in a broadband cable network, the method comprising:
   receiving the packets and downconverting the packets at a RF subsystem including a control and data packet having a header that has at least five fields selected from the group consisting of a transmit clock field, packet type field, packet subtype field, version field, source node ID field, destination node ID field, and header check sequence field and variable length payload;

removing control information from the packets in a Modem subsystem that is in signal communication with the RF subsystem; and retrieving data for use by the BCN modem at a MAC subsystem that is in signal communication with the Modem subsystem and in receipt of the packet with the control information removed;

wherein at least one of the packets is a beacon packet that has a channel number field, change field, sequence number field, network coordinator ID field, next beacon index field, admission frame length field, admission window, asynchronous MAP length field and a beacon Cyclic Redundancy Checking (CRC) field.

* * * * *